United States Patent
Bild et al.

(10) Patent No.: US 10,965,653 B2
(45) Date of Patent: Mar. 30, 2021

(54) SCALABLE AND SECURE MESSAGE BROKERING APPROACH IN A COMMUNICATION SYSTEM

(71) Applicant: Xaptum, Inc., Chicago, IL (US)

(72) Inventors: David Robinson Bild, Chicago, IL (US); Pradeep Srinivas Barthur, White Plains, NY (US); Irina Guberman, Buffalo Grove, IL (US); Zane Van Beckwith, Chicago, IL (US); Gary W. Grube, Barrington Hills, IL (US); Mario Frank DeRango, Cary, IL (US); Venkatakumar Srinivasan, Chicago, IL (US)

(73) Assignee: Xaptum, Inc., Chicago, IL (US)

( * ) Notice: Subject to any disclaimer, the term of this patent is extended or adjusted under 35 U.S.C. 154(b) by 197 days.

(21) Appl. No.: 16/360,386

(22) Filed: Mar. 21, 2019

(65) Prior Publication Data

US 2019/0306124 A1    Oct. 3, 2019

Related U.S. Application Data

(60) Provisional application No. 62/649,537, filed on Mar. 28, 2018.

(51) Int. Cl.
*H04L 29/06* (2006.01)
*H04L 9/08* (2006.01)
*H04L 29/08* (2006.01)

(52) U.S. Cl.
CPC .......... *H04L 63/045* (2013.01); *H04L 9/0833* (2013.01); *H04L 63/0471* (2013.01); *H04L 63/0478* (2013.01); *H04L 67/2809* (2013.01)

(58) Field of Classification Search
CPC .................................................. H04L 63/045
(Continued)

(56) References Cited

U.S. PATENT DOCUMENTS

| | | |
|---|---|---|
| 5,410,475 A | 4/1995 | Lu |
| 5,978,386 A | 11/1999 | Haemaelaeinen |

(Continued)

FOREIGN PATENT DOCUMENTS

| | | |
|---|---|---|
| EP | 0931418 A2 | 7/1999 |
| EP | 1856602 A2 | 11/2007 |

(Continued)

OTHER PUBLICATIONS

Blaze et al., "Divertible Protocols and Atomic Proxy Cryptography", 1998 (Year: 1998).*

(Continued)

*Primary Examiner* — Ondrej C Vostal
(74) *Attorney, Agent, or Firm* — Garlick & Markison; Gary W. Grube

(57) ABSTRACT

A method includes a first computing entity receiving a request for first data from an affiliated source device by a user device. When a re-encryption key of the user device is not based on a key pair of the first computing entity the method further includes decrypting the first encrypted data using a private key of the first computing entity and encrypting the recovered first data with a public key of a second computing entity to produce second encrypted data. The method further includes encrypting the second encrypted data with the re-encryption key of the user device to produce double encrypted data. The method further includes sending the double encrypted data to the user device, where the user device is capable of decrypting the double encrypted data to recover the first data using a private key of the user device based on a key pair of the second computing entity.

18 Claims, 15 Drawing Sheets

(58) Field of Classification Search
USPC .......................................................... 713/153
See application file for complete search history.

(56) References Cited

U.S. PATENT DOCUMENTS

| | | | |
|---|---|---|---|
| 6,097,794 A | 8/2000 | Suffern | |
| 6,311,171 B1* | 10/2001 | Dent | G06Q 20/02 |
| | | | 705/64 |
| 6,430,184 B1 | 8/2002 | Robins | |
| 6,651,099 B1 | 11/2003 | Dietz | |
| 6,661,431 B1 | 12/2003 | Stuart | |
| 6,667,700 B1 | 12/2003 | McCanne | |
| 6,721,333 B1 | 4/2004 | Milton | |
| 6,859,835 B1 | 2/2005 | Hipp | |
| 7,120,790 B1 | 10/2006 | Lopresti | |
| 7,319,847 B2 | 1/2008 | Xanthos | |
| 7,590,715 B1 | 9/2009 | Raanan | |
| 8,073,973 B2 | 12/2011 | McCann | |
| 8,291,058 B2 | 10/2012 | Head | |
| 8,321,434 B1 | 11/2012 | Ren | |
| 9,887,911 B2 | 2/2018 | Pasam | |
| 2002/0085575 A1 | 7/2002 | Smith | |
| 2002/0176378 A1 | 11/2002 | Hamilton | |
| 2003/0140140 A1 | 7/2003 | Lahtinen | |
| 2003/0204720 A1* | 10/2003 | Schoen | H04L 63/0823 |
| | | | 713/153 |
| 2004/0128552 A1 | 7/2004 | Toomey | |
| 2005/0005145 A1 | 1/2005 | Teixeira | |
| 2006/0092930 A1 | 5/2006 | Shah | |
| 2006/0126510 A1 | 6/2006 | Russell | |
| 2007/0195780 A1 | 8/2007 | Cabeca | |
| 2008/0115149 A1 | 5/2008 | Rupp | |
| 2009/0063625 A1 | 3/2009 | Bagepalli | |
| 2009/0070779 A1* | 3/2009 | Wang | H04L 67/02 |
| | | | 719/314 |
| 2009/0097506 A1 | 4/2009 | Subrahmanyan | |
| 2009/0168760 A1 | 7/2009 | Katis | |
| 2009/0199210 A1 | 8/2009 | Smith, Jr. | |
| 2009/0210697 A1* | 8/2009 | Chen | H04L 9/3013 |
| | | | 713/153 |
| 2009/0222590 A1 | 9/2009 | Van Aken | |
| 2009/0323703 A1 | 12/2009 | Bragagnini | |
| 2009/0323718 A1 | 12/2009 | Oren-Dahan | |
| 2010/0023524 A1 | 1/2010 | Gladwin | |
| 2010/0095367 A1 | 4/2010 | Narayanaswamy | |
| 2010/0233961 A1 | 9/2010 | Holden | |
| 2011/0047371 A1* | 2/2011 | Timby | G06F 21/33 |
| | | | 713/153 |
| 2011/0070868 A1 | 3/2011 | Scholz | |
| 2011/0145181 A1 | 6/2011 | Pandya | |
| 2011/0228744 A1 | 9/2011 | Cai | |
| 2011/0264657 A1 | 10/2011 | Hoffman | |
| 2012/0102055 A1 | 4/2012 | Hu | |
| 2012/0120967 A1 | 5/2012 | Ghiasi | |
| 2012/0210426 A1 | 8/2012 | Yu | |
| 2012/0253728 A1 | 10/2012 | Chamas | |
| 2013/0094451 A1 | 4/2013 | Pavlovski | |
| 2013/0111217 A1 | 5/2013 | Kopasz | |
| 2013/0136127 A1 | 5/2013 | Hill | |
| 2013/0211555 A1 | 8/2013 | Lawson | |
| 2013/0304616 A1 | 11/2013 | Raleigh | |
| 2013/0322626 A1 | 12/2013 | Yang | |
| 2014/0006632 A1 | 1/2014 | Evens | |
| 2014/0028462 A1 | 1/2014 | Lawson | |
| 2014/0280829 A1 | 9/2014 | Kjendal | |
| 2015/0043735 A1* | 2/2015 | Fujii | H04L 9/14 |
| | | | 380/277 |
| 2015/0156266 A1 | 6/2015 | Gupta | |
| 2016/0119198 A1 | 4/2016 | Kfir | |
| 2016/0210578 A1 | 7/2016 | Raleigh | |
| 2016/0330022 A1* | 11/2016 | Ito | H04L 9/0861 |
| 2016/0380767 A1* | 12/2016 | Hayashi | H04L 9/3073 |
| | | | 380/45 |
| 2017/0026469 A1 | 1/2017 | Usgaonkar | |
| 2017/0250816 A1* | 8/2017 | Popa | G06F 21/12 |
| 2017/0323114 A1* | 11/2017 | Egorov | H04L 9/0618 |
| 2018/0026873 A1 | 1/2018 | Cheng et al. | |
| 2018/0270069 A1* | 9/2018 | Yan | G06F 16/174 |

FOREIGN PATENT DOCUMENTS

| | | |
|---|---|---|
| EP | 1446906 B1 | 12/2007 |
| WO | 0049481 A2 | 8/2000 |

OTHER PUBLICATIONS

Handley, et al., SIP: Session Initiation Protocol, Mar. 1999, www.rfc-base.org., RFC2543.
International Search Report corresponding to International Patent Application Serial No. PCT/US14/19595, United States Patent and Trademark Office, dated Feb. 28, 2014; (4 pages).
International Written Opinion corresponding to International Patent Application Serial No. PCT/US14/19595, United States Patent and Trademark Office, dated Feb. 28, 2014; (5 pages).

* cited by examiner

SCALABLE AND SECURE MESSAGE BROKERING APPROACH IN A COMMUNICATION SYSTEM

CROSS REFERENCE TO RELATED PATENTS

The present U.S. Utility Patent Application claims priority pursuant to 35 U.S.C. § 119(e) to U.S. Provisional Application No. 62/649,537, entitled "SCALABLE AND SECURE MESSAGE BROKERING APPROACH IN A COMMUNICATION SYSTEM," filed Mar. 28, 2018, which is hereby incorporated herein by reference in its entirety and made part of the present U.S. Utility Patent Application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Technical Field of the Invention

This invention relates generally to computer networks and more particularly to data communication systems.

Description of Related Art

The use of computers to communicate text files, voice files, multimedia files, and even live data streaming is known. Most computers utilize the Internet protocol (IP) to communicate via the Internet. The Internet protocol is known to be the primary network communications protocol utilized on the Internet, where IP provides a network layer protocol in accordance with one or more industry standards such as transmission control protocol (TCP), user datagram protocol (UDP), and stream control transmission protocol (SCTP).

It is also known for computers to utilize a transport protocol on top of the network layer protocol to transport data between computing devices, where the transport protocol is in accordance with one or more industry standard session protocols such as hypertext transfer protocol (HTTP) and Message queue telemetry transport (MQQT). Further industry standards have resulted in a focus on so-called constrained devices where lower power devices and lossy networks may be joined by the Internet. One such resulting industry standard is the constrained application protocol (CoAP) which provides a service layer protocol over the session protocol HTTP over the network layer protocol UDP. Computers are generally required to understand the protocol and data format from the various devices connected to the same network.

BRIEF DESCRIPTION OF THE SEVERAL VIEWS OF THE DRAWING(S)

DETAILED DESCRIPTION OF THE INVENTION

Figure 1A:
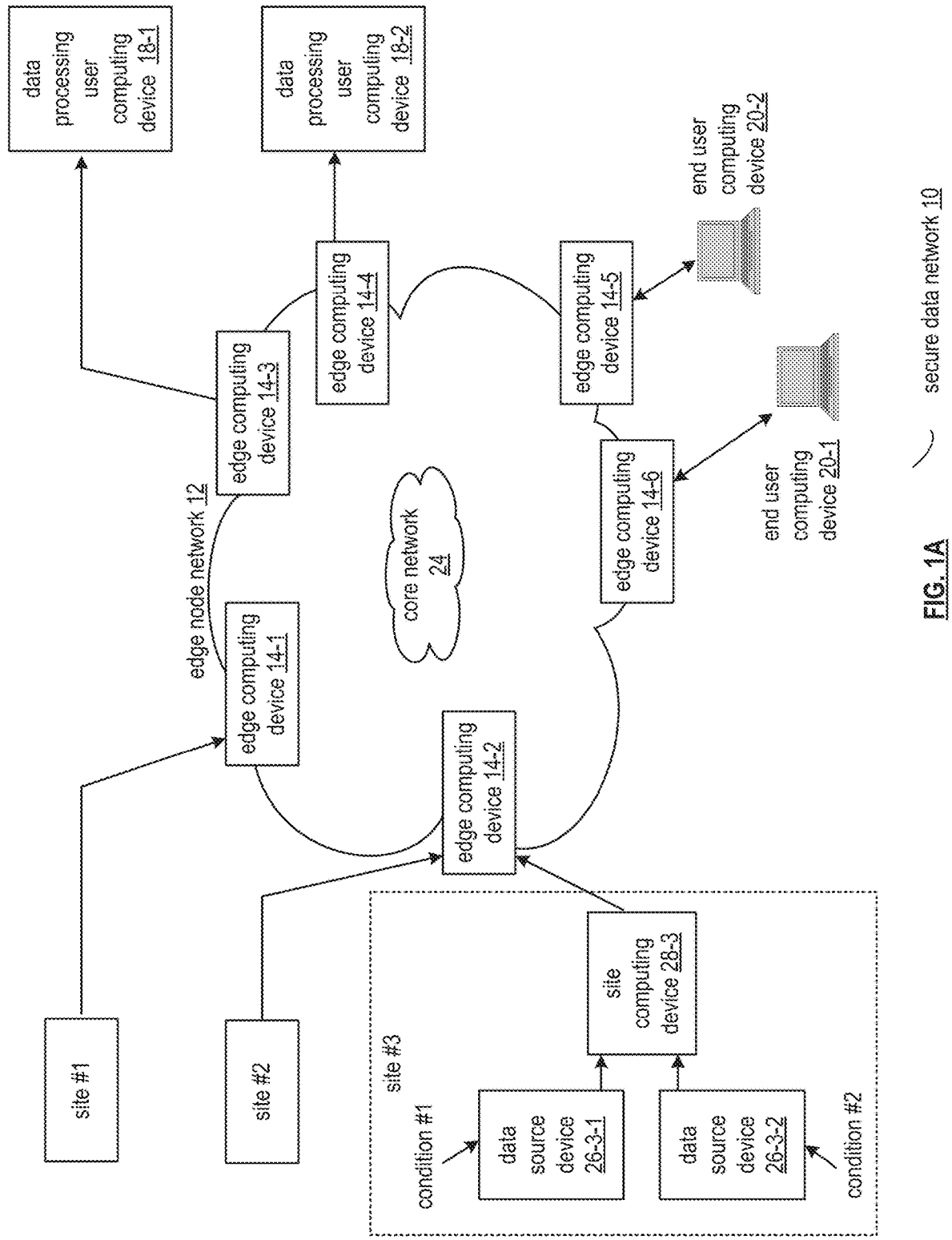
FIGS. 1A-1E are schematic block diagrams of embodiments of a secure data network in accordance with the present invention.

FIGS. 1A-1E are schematic block diagrams of embodiments of a secure data network. FIG. 1A is a schematic block diagram of an embodiment of a secure data network 10 that includes an edge node network 12, a plurality of sites #1 through #3, a core network 24, a plurality of data processing user computing devices 18-1 through 18-2, and a plurality of end user computing devices 20-1 through 20-2. The core network 24 includes at least one of the Internet, a public radio access network (RAN), and any private network. The edge node network 12 includes a plurality of edge computing devices 14-1 through 14-6 which utilize the core network 24 to communicate with each other.

Alternatively, the edge computing devices may communicate directly with each other by utilizing various access technologies including one or more of T-carrier/E-carrier (T1/E1), Digital Subscriber Line (DSL), Metro Ethernet, Hybrid Fiber Coax (HFC), and optical fiber. For instance, a transport protocol such as Multiprotocol Label Switching (MPLS), Asynchronous Transport Mode (ATM), or frame relay provides communications between distant edge computing devices over the access technology.

The sites include one or more data source devices and a site computing device for monitoring various conditions within a geographic area associated with each site. Each site may be associated with at least a portion of a facility (e.g., a home, an apartment, a store, a school, a hospital, a hotel, an office, a factory, a refinery, a farm plot, an airport, a water treatment plant, electrical generation and/or transmission complex, an oil exploration facility, etc.). For example, site #3 includes site computing device 28-3 and data source devices 26-3-1 and 26-3-2. Each data source device is capable of detecting at least one condition, generating data based on the condition (e.g., on both a continual basis or when requested), and sending the data to an associated site computing device for temporary storage and sharing, via the edge node network 12, with various data processing user computing devices and end-user computing devices. The site computing device determines which of the various data processing user computing devices and end-user computing devices to share the data with based on authorized requests for the data.

The data includes one or more of sensor data associated with the condition of a local environment (e.g., a site) and use data (e.g., statistical usage data, user identifiers, error messages, alerts, warnings, level information, etc.) associated with a mechanism (e.g., a machine, a local computer, etc.). The sensor data further includes raw sensor data (e.g., directly from the sensor) and an interpretation of the raw sensor data (e.g., a summary, a result of applying an algorithm to the raw sensor data). The data still further includes data retrieved from a memory device associated with the data source device and any other data produced by the data source device.

The edge computing devices of the edge node network 12 route the requests for the data from the data processing user computing devices and the end user computing devices to the site computing devices. The edge computing devices further routes the data from the site computing devices to the data processing user computing devices and end user computing devices associated with the requests for the data. The routing by the edge computing devices is based on various authentication and authorization techniques to ensure that only authorized user computing devices (e.g., end-user computing devices and/or data processing user computing devices) are allowed to access data from the data source devices. Thus, the edge node network 12 provides additional data transport security beyond the core network 24.

The data processing user computing devices 18-1 and 18-2 request the data and process the data to produce process data. The processing of the data includes executing various data applications utilizing the data, storing the data, utilizing the data as inputs to an operational control system to provide a service, and using the data in a hosted data application. The requesting of the data is in accordance with needs of the various applications and services.

The end user computing devices 20-1 and 20-2 request the data and further request results of the processing of the data. For example, the end-user computing devices control the various data applications hosted by the data processing user computing devices and receive results of execution of the data applications (e.g., receive the processed data).

The site computing devices, edge computing devices, data processing user computing devices and end user computing devices may be implemented with a computing entity. A computing entity includes a cluster of one or more computing devices. For example, a first computing entity may be implemented to include the site computing device 28-3 and the edge computing device 14-2.

Figure 2:
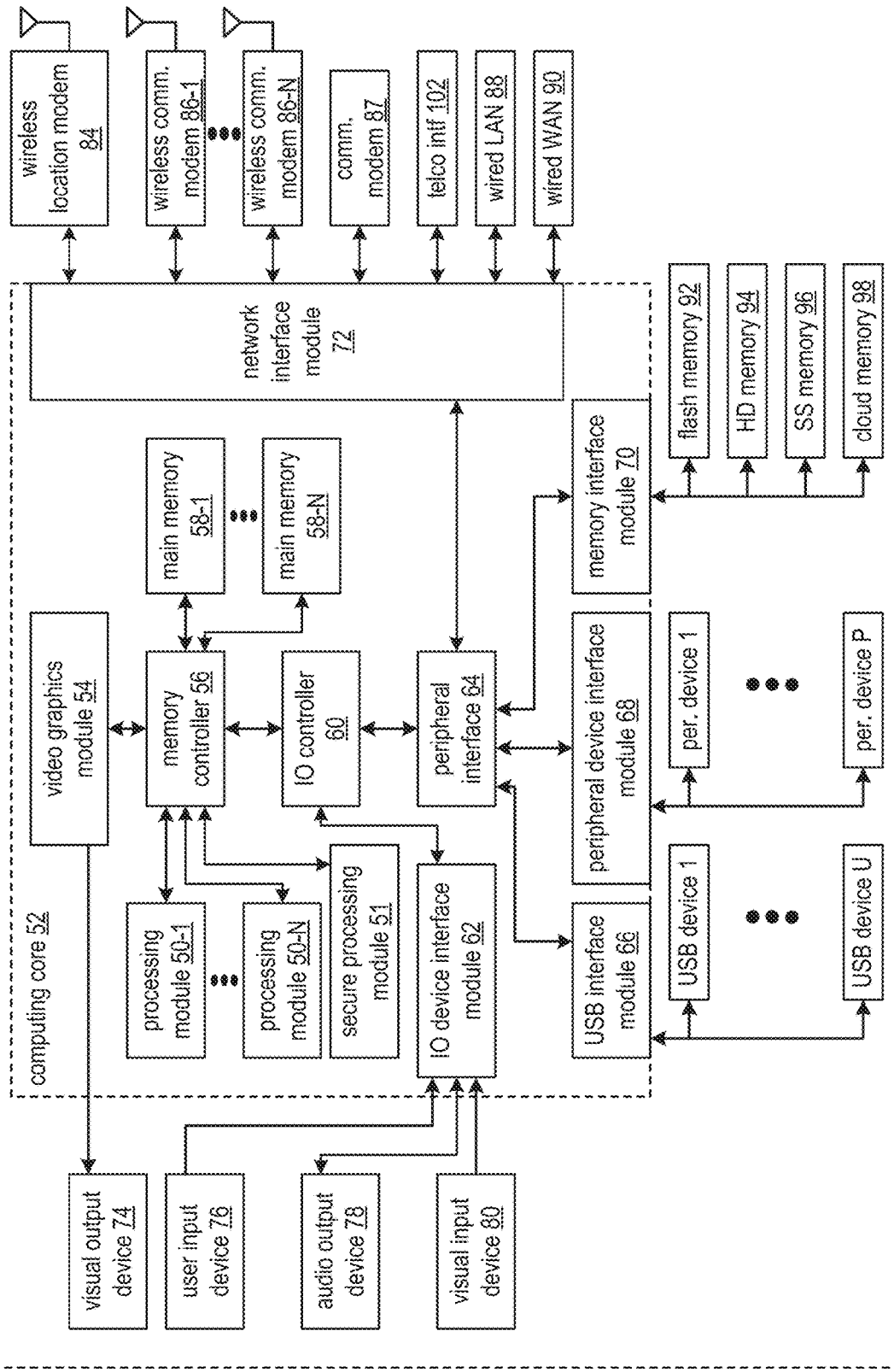
FIG. 2 is a schematic block diagram of an embodiment of a computing device of a secure data network in accordance with the present invention.

Each computing device includes one or more computing cores and each computing core includes one or more processing modules along with memory and input/output support devices and/or modules as illustrated in FIG. 2. In general, a computing core is any electronic device that can communicate data, process data, and/or store data.

Computing devices include portable computing devices and fixed computing devices. Examples of portable computing devices include an embedded controller, a smart sensor, a social networking device, a gaming device, a smart phone, a laptop computer, a tablet computer, a video game controller, and/or any other portable device that includes a computing core. Examples of fixed computing devices include a personal computer (PC), a computer server, a cable set-top box, a satellite receiver, a television set, a printer, a home appliance, home entertainment equipment, a security camera controller, a video game console, a critical infrastructure controller, and/or any type of home or office computing equipment that includes a computing core.

The secure data network 10 generally supports secure routing of the data from the sites to the user computing devices based on security procedures, synchronization parameters, and configuration information. Examples of the security procedures includes identifying computing devices, challenging identity through authentication, producing encryption keys, securely exchanging authentication information, encrypting computing device identifiers, and encrypting data for transmission, while preserving device anonymity when desired. The encrypting of the data includes utilization of encryption keys with an encryption algorithm.

The synchronization parameters include one or more of control information, configuration information, and analytics information. The control information includes operational mode information and routing information (e.g., routes). The operational mode information includes how a computing device is to operate, i.e. as an edge computing device and/or as a site computing device. The operational mode information further includes which functions are to be supported by the computing device (e.g., routing, security, ingress support, egress support, pass-through support).

The configuration information includes deployment information, software information, security information, routing information, addressing information, protocol information, and presence information. The deployment information includes lists of logical connection paths between edge computing devices, data source devices associated with a particular edge computing device or site computing device, data source devices associated with particular data processing user computing devices, data source devices associated with particular applications and/or storage facilities of a particular data processing user computing device, etc.

The software information includes software version lists and software for site computing devices and edge computing devices. The security information includes public-private encryption keys, key generation values, key seeds, key identifiers, encryption algorithm identifiers, updated encryption algorithms, hardware-embedded secret keys, etc.

The routing information includes status of routes between edge computing devices, physical links between edge computing devices, etc. The addressing information includes identifiers of data source devices, identifiers of site computing devices and edge computing devices, and identifiers of sites, etc.

The protocol information includes desired protocol(s) for an application supported by the data processing user computing devices 18-1 and 18-2, data protocol identifiers associated with messages that traverse the edge node network 12 carrying data and more, and data protocols supported by the data source devices, etc. The presence information includes real-time status of computing devices of the secure data network 10 and historical status information of the computing devices.

The analytics information includes summaries of use of the secured data network 10 and portions of the data. The summaries include a list of data types of the data being communicated on the secure data network 10, historical patterns of the data type communication, and historical usage patterns of the secure data network 10 to communicate data on behalf of each data source device, etc. The portions of the data include random samples of data, targeted samples of the data, and data associated with a particular historical pattern.

Figure 1B:
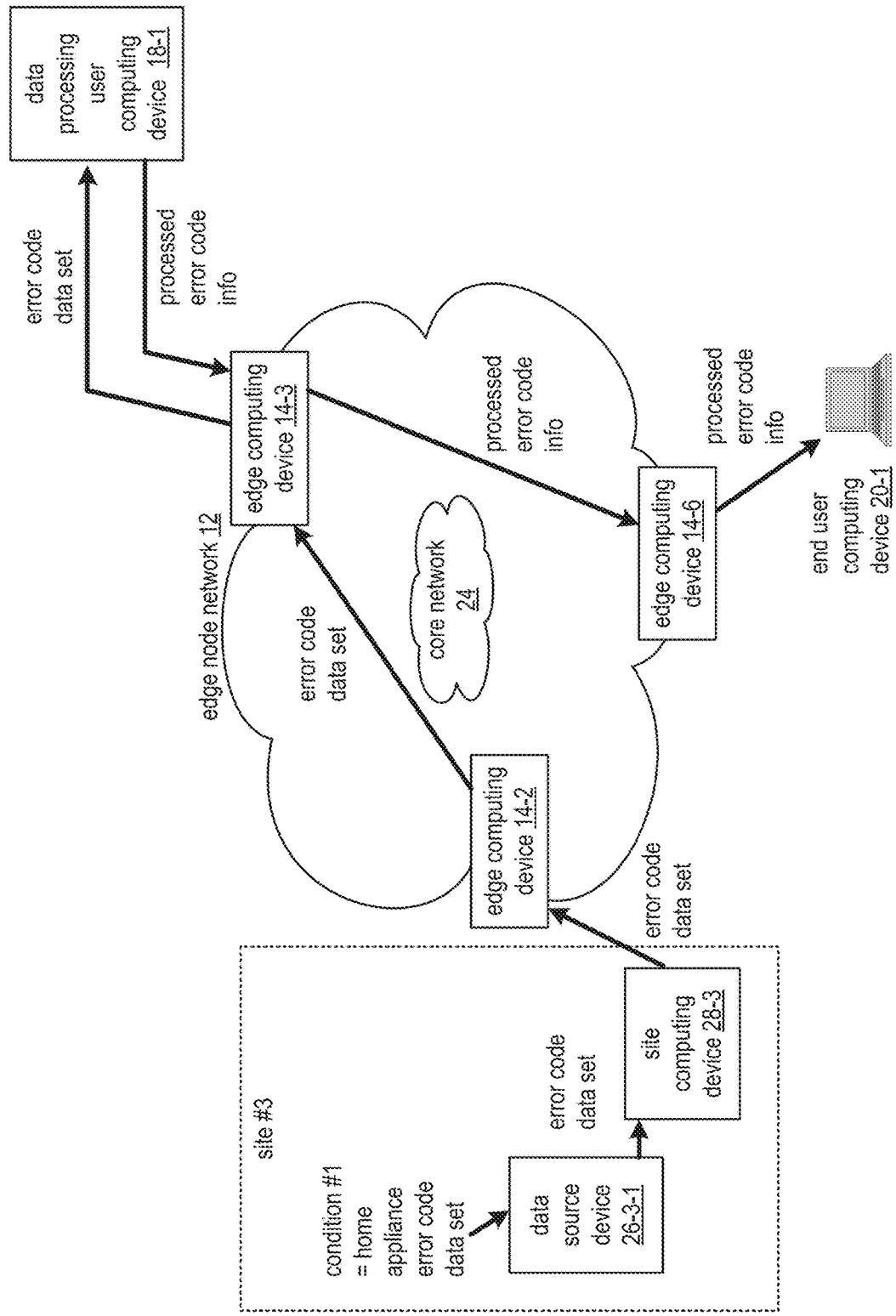

FIG. 1B illustrates an example of operation of the secure data network of FIG. 1A, where the condition monitored by the data source device 26-3-1 includes a home appliance error code data set (e.g., operational parameters, alerts, status, etc. of a washing machine or refrigerator, etc.). The example further includes a home appliance error code processing application hosted by the data processing user computing device 18-1 processing the error code data set to provide processed error code information to the end-user computing device 20-1.

Having received a request from the data processing user computing device 18-1 for the home appliance error code data set (e.g., targeting site #3), the site computing device 28-3 obtains the home appliance error code data set from the data source device 26-3-1 and forwards the error code data set to a first edge computing device (e.g., the edge computing device 14-2) of the edge node network 12. Having received the error code data set, the edge computing device 14-2 selects a route through the edge node network 12 to send the error code data set to the edge computing device 14-3 that is associated with the data processing user computing device 18-1.

The data processing user computing device 18-1 processes the error code data set utilizing a home appliance data processing application to produce processed error code information (e.g., a suggested maintenance plan). Having previously established affiliation between the data processing user computing device 18-1 and the end-user computing device 20-1, the data processing user computing device 18-1 sends the processed error code information to the edge computing device 14-3 for routing to the edge computing device 14-6 that is affiliated with the end-user computing device 20-1. The edge computing device 14-6 forwards the processed error code information to the end-user computing device 20-1 where the end-user computing device 20-1 displays the suggested maintenance plan.

Figure 1C:
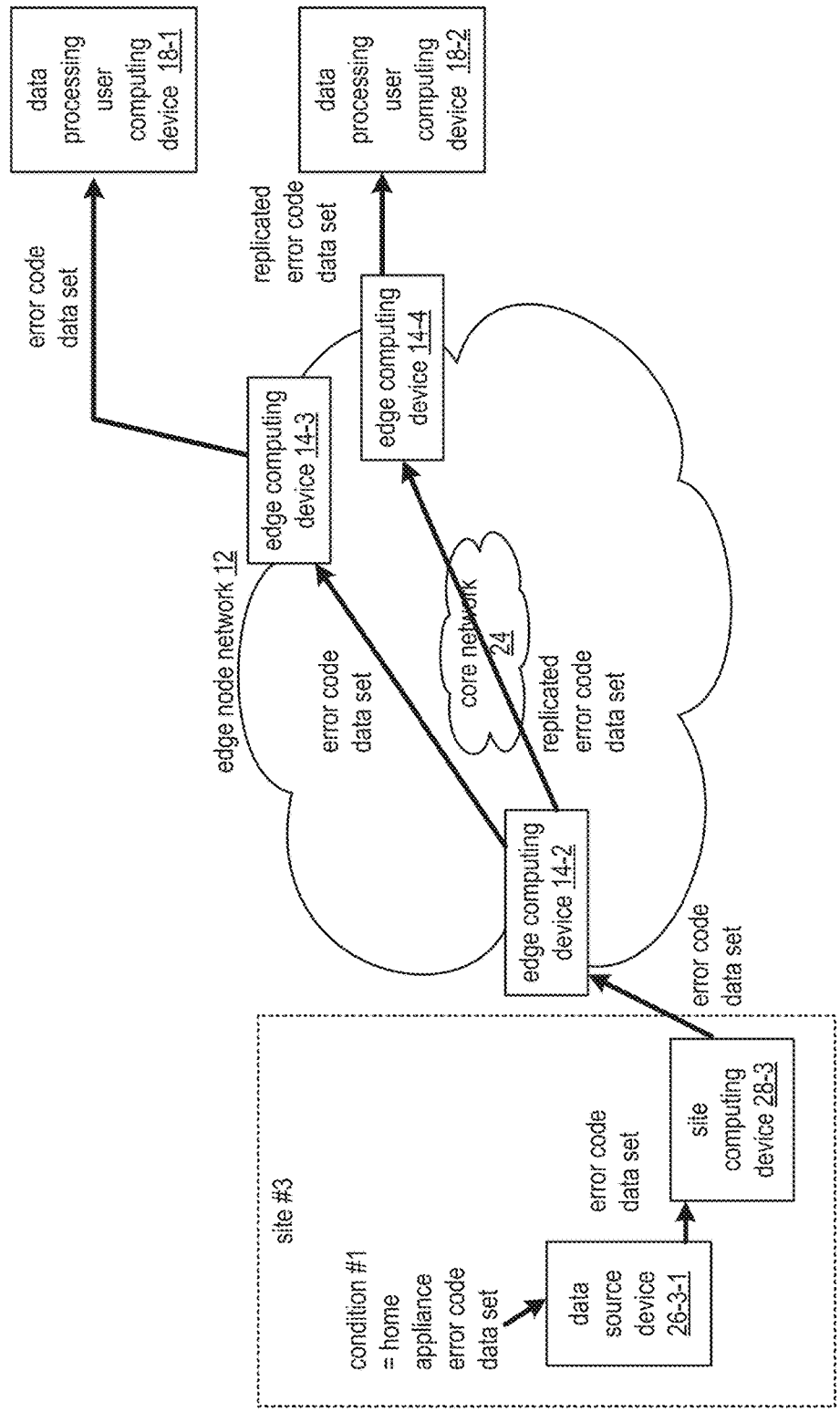

FIG. 1C illustrates another example of operation of the secure data network of FIG. 1B, where two user computing devices seek the same data from a common data source device. In the example, having approved two requests for the home appliance error code data set, the site computing device 28-3 forwards the error code data set to the edge computing device 14-2. A first request for the error code data set is received from the data processing user computing device 18-1 (e.g., hosting a consumer advice home appliance maintenance application). A second request for the error code data set as received from the data processing user computing device 18-2 (e.g., hosting a home appliance manufacturer reliability analysis application).

Having received the error code data set, the edge computing device 14-2 selects a route through the edge node network 12 to send the error code data set as a first response to the first request over to the data processing user computing device 18-1 that is coupled to the edge computing device 14-3. The edge computing device 14-2 further selects another route through the edge node network 12 to send the error code data set as replicated error code data set to provide a second response to the second request over to the data processing user computing device 18-2 that is coupled to the edge computing device 14-4. The edge computing device 14-2 selects the routes and simultaneously sends the error code data set as the two responses to eliminate a need for the data source device 26-3-1 to perform the replication of the data and sending of two responses in response to the two requests.

Figure 1D:
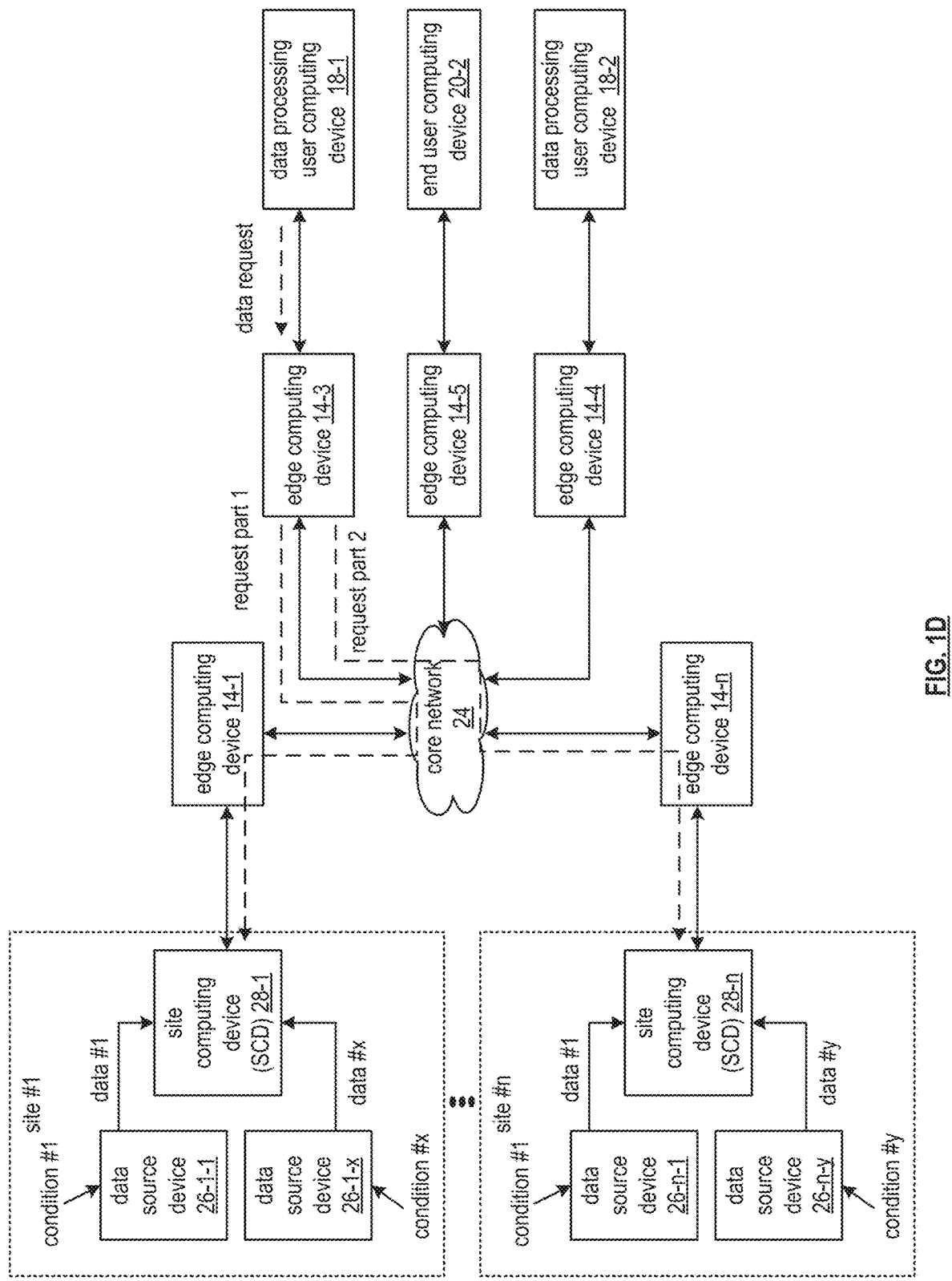

FIG. 1D illustrates another example of operation of the secure data network of FIG. 1A, where one user computing device seeks multiple data from multiple data source devices. In the example, where the data processing user computing device 18-1 desires data from two sites of a plurality of n sites. Each site offers a plurality of data (e.g., data #1 through data #x, data #1 through data #y) based on a plurality of conditions (e.g., condition #1 through condition #x and condition #1 through condition #y). For instance, the data processing user computing device 18-1 requests data 1, data 3, and data 12 from site #1 and data 2 and data 7 from site #n. The data processing user computing device 18-1 issues a data request to the edge computing device 14-3 that is affiliated with the data processing user computing device 18-1. The data request includes a list of the desired data from the two sites.

Having received the data request, the edge computing device 14-3 issues, via the core network 24 and the edge computing device 14-1 that is affiliated with the site #1, a request part 1 to the site computing device 28-1 that is associated with the site #1. The request part 1 includes a request for the data 1, the data 3, and the data 12 from site #1. The edge computing device 14-3 further issues, via the core network 24 and the edge computing device 14-n that is associated with the site #n, a request part 2 to the site computing device 28-n that is associated with the site #n.

The issuing of the request parts 1 and 2 includes determining where to send the requests. The determining includes utilizing at least one of a site identifier associated with the data request, interpreting a table that maps data to particular site computing devices, and interpreting a response to a request that seeks to identify the particular site computing device associated with an identifier of the desired data.

Figure 1E:
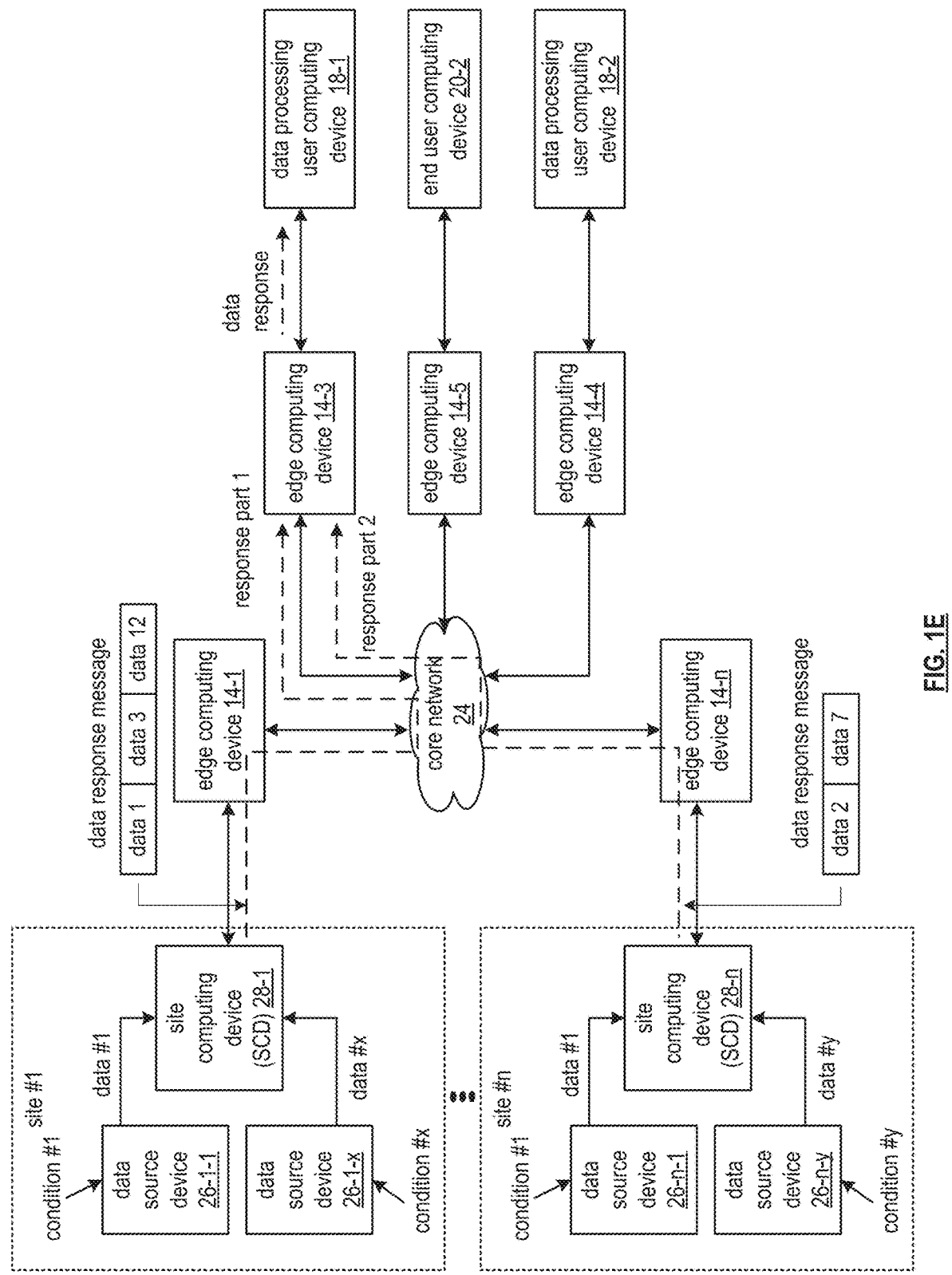

FIG. 1E further illustrates the example of operation of the secure data network of FIG. 1D, where, having received a request part 1, the site computing device 28-1 issues a response part 1 to the edge computing device 14-3. The response part 1 includes a data response message based on the request part 1. For example, the site computing device 28-1 generates the data response message to include the data 1, the data 3, and the data 12. The issuing includes identifying the edge computing device 14-3 that is associated with the data processing user computing device 18-1 of the data request. For instance, the site computing device 28-1 identifies the edge computing device 14-3 based on a table that maps the data processing user computing device 18-1 to the edge computing device 14-3.

The issuing of the response part 1 includes the site computing device 28-1 sending the data response message to the edge computing device 14-1 that is affiliated with the site computing device 28-1. Having received the data response message, the edge computing device 14-1 sends, via the core network 24, the data response message as the response part 1 to the edge computing device 14-3. The sending includes determining a route when route choices are available to include various edge computing devices between the edge computing device 14-1 and the edge computing device 14-3.

In a similar fashion, the site computing device 28-n generates another data response message to include the data 2 in the data 7 as a response part 2 based on the request part 2. Having generated the data response message, the site computing device 28-n sends, via the edge computing device 14-n and the core network 24, the response part 2 to the edge computing device 14-3. Having received the response parts 1 and 2, the edge computing device 14-3 sends one or more of the response parts 1 and 2 as a data response to the data processing user computing device 18-1.

FIG. 2 is a schematic block diagram of various computing devices of the secure data network 10 of FIG. 1. In an embodiment, the edge computing devices 14, the site computing devices 28, the data processing user computing devices 18, and the end-user computing devices 20 include a computing core 52, one or more visual output devices 74 (e.g., video graphics display, touchscreen, LED, etc.), one or more user input devices 76 (e.g., keypad, keyboard, touchscreen, voice to text, a push button, a microphone, etc.), one or more audio output devices 78 (e.g., speaker(s), headphone jack, a motor, etc.), and one or more visual input devices 80 (e.g., camera, photocell, etc.).

The computing devices further include one or more universal serial bus (USB) devices (USB devices 1-U), one or more peripheral devices (e.g., peripheral devices 1-P), and one or more memory devices (e.g., one or more flash memory devices 92, one or more hard drive (HD) memories 94, one or more solid state (SS) memory devices 96, and/or cloud memory 98). The computing devices further include one or more wireless location modems 84 (e.g., global positioning satellite (GPS), Wi-Fi, angle of arrival, time difference of arrival, signal strength, dedicated wireless location, etc.), and one or more wireless communication modems 86-1 through 86-N (e.g., a cellular network transceiver, a wireless data network transceiver, a Wi-Fi transceiver, a Bluetooth transceiver, a 315 MHz transceiver, a zig bee transceiver, a 60 GHz transceiver, etc.). The nodes further include a telco interface 102 (e.g., to interface to a public switched telephone network), a wired local area network (LAN) 88 (e.g., optical, electrical), a wired wide area network (WAN) 90 (e.g., optical, electrical), and a communication modem 87 (e.g., facilitating wireless and/or wireline communications of data).

The computing core 52 includes a video graphics module 54, one or more processing modules 50-1 through 50-N, a secure processing module 51 (e.g., storing keys and executing encryption algorithms), a memory controller 56, one or more main memories 58-1 through 58-N (e.g., RAM as local memory), and one or more input/output (I/O) device interface modules 62. The computing core 52 further includes an input/output (I/O) controller 60, a peripheral interface 64, one or more USB interface modules 66, one or more network interface modules 72, one or more memory interface modules 70, and/or one or more peripheral device interface modules 68.

Each of the interface modules 62, 66, 68, 70, and 72 includes a combination of hardware (e.g., connectors, wiring, etc.) and operational instructions stored on memory (e.g., driver software) that are executed by one or more of the processing modules 50-1 through 50-N and/or a processing circuit within the interface module. Each of the interface modules couples to one or more components of the computing devices. For example, one of the IO device interface modules 62 couples to an audio output device 78. As another example, one of the memory interface modules 70 couples to flash memory 92 and another one of the memory interface modules 70 couples to cloud memory 98 (e.g., an on-line storage system and/or on-line backup system).

In other embodiments, the computing devices may include more or less devices and modules than shown in this example embodiment. The secure processing module 51 (e.g., Trusted Platform Module (TPM)) includes a hardware module for securely generating and storing security parameters (e.g., encryption keys) when required for secure attestation and authenticated access to the edge node network 12 and cannot be tampered with by application software.

Figure 3:
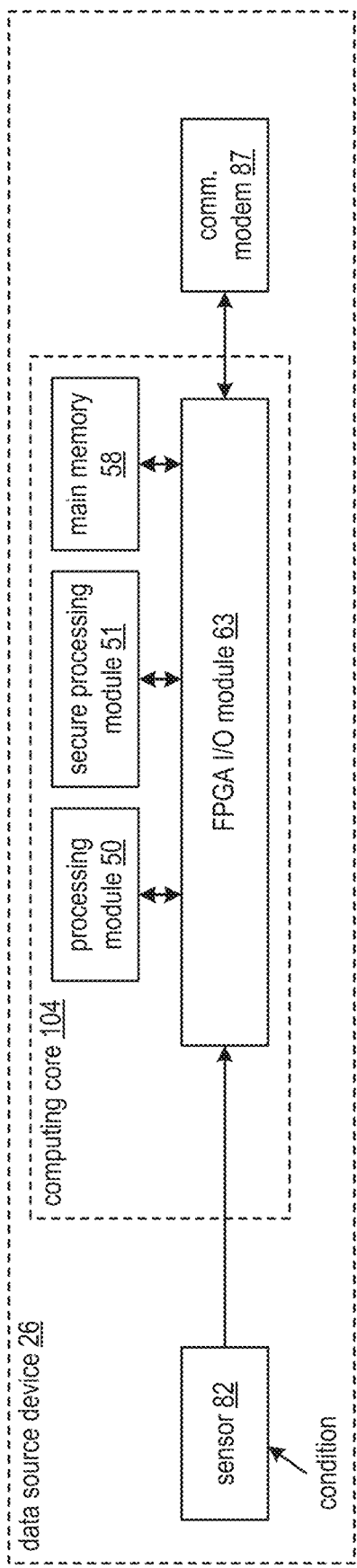
FIGS. 3 and 4 are schematic block diagrams of an embodiment of a data source device of a secure data network in accordance with the present invention.

FIG. 3 is a schematic block diagram of an embodiment of the data source device 26 of FIG. 1. The data source device 26 includes a sensor 82, a computing core 104, and the communication modem 87 of FIG. 2. The computing core 104 includes at least one processing module 50 of the processing modules 50-1 through 50-N of FIG. 2, the secure processing module 51 of FIG. 2, at least one main memory 58 of the main memories 58-1 through 58-N of FIG. 2, and one or more Field Programmable Gate Array (FPGA) input/output (I/O) modules 63. In other embodiments, the device may include more or less devices and modules than shown in this example embodiment. In other embodiments, the data source device 26 includes more or less devices and modules than shown in this example embodiment. For instance, the computing core 104 only includes the FPGA I/O module 63.

The sensor 82 interprets the condition to provide sensor data to the computing core 104. The computing core 104 generates data based on the sensor data of the condition and sends, via the communication modem 87, the data to an associated site computing device. For instance, the processing module 50 controls the FPGA I/O module 63 to route the sensor data to the main memory 58 for temporary storage. The processing module 50 subsequently routes, via the FPGA I/O module 63, the temporarily stored sensor data from the main memory 58 to the secure processing module 51 for encryption to produce encrypted data. The encryption is performed utilizing a selected encryption algorithm and encryption key stored within the secure processing module 51.

Having facilitated encryption of the data, the processing module 50 further facilitates routing, via the FPGA I/O module 63, of the encrypted data from the secure processing module 51 to the communication modem 87 for transmission to the associated site computing device. Alternatively, the processing module 50 further facilitates routing, via the FPGA I/O module 63, the encrypted data from the secure processing module 51 to the main memory 58 for temporary storage until the communication modem 87 is ready to transmit the encrypted data.

Figure 4:
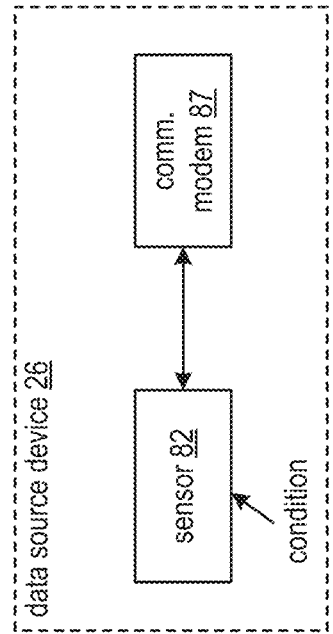

FIG. 4 illustrates another embodiment of the data source device 26 of FIG. 3. The data source device 26 includes the sensor 82 of FIG. 3 and the communication modem 87 of FIG. 2. In an example of operation, the sensor 82 interprets the condition to produce the sensor data and sends the sensor data to the communication modem 87 for transmission to the associated site controller device.

Figure 5A:
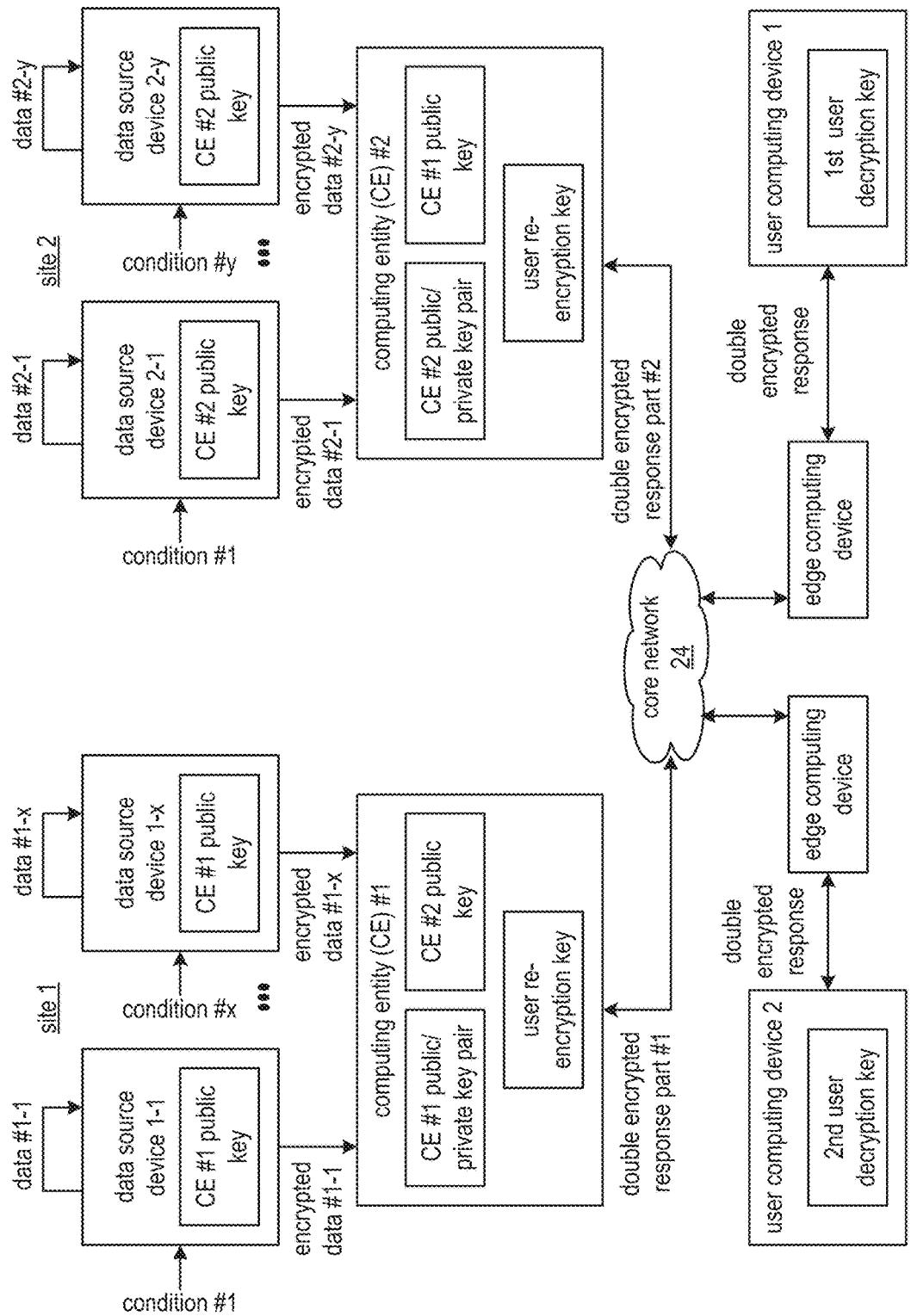
FIGS. 5A and 5C are schematic block diagrams of an embodiment of a secure data network illustrating methods to securely provide message brokering in accordance with the present invention.
Figure 5B:
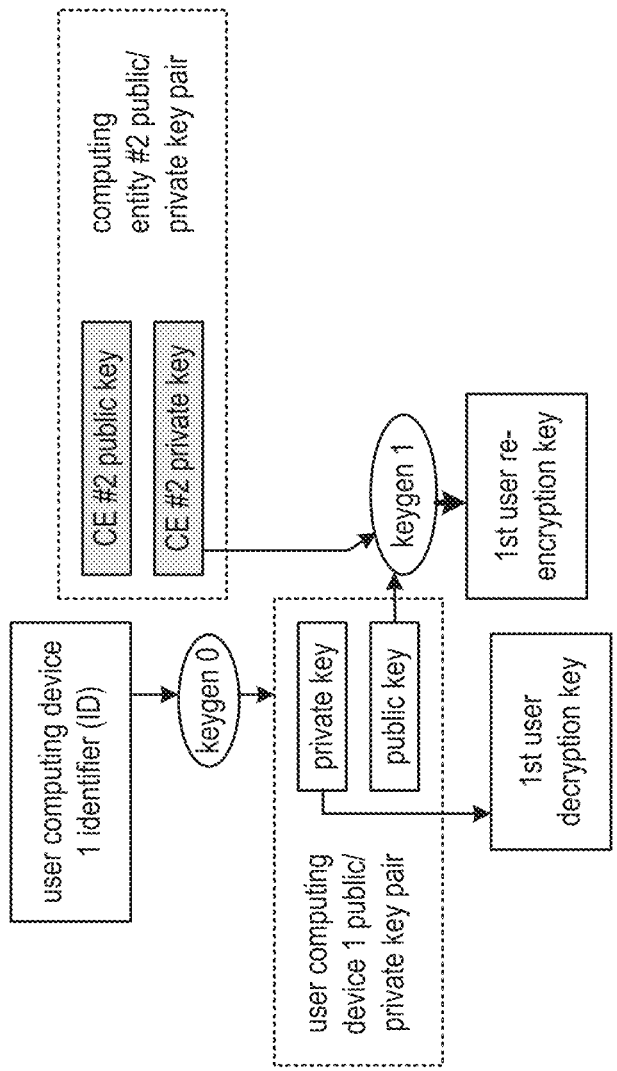
FIG. 5B is a logic diagram illustrating of an example of generating encryption keys to support the secure message brokering of in the secure data network of FIGS. 5A and 5C in accordance with the present invention.
Figure 5C:
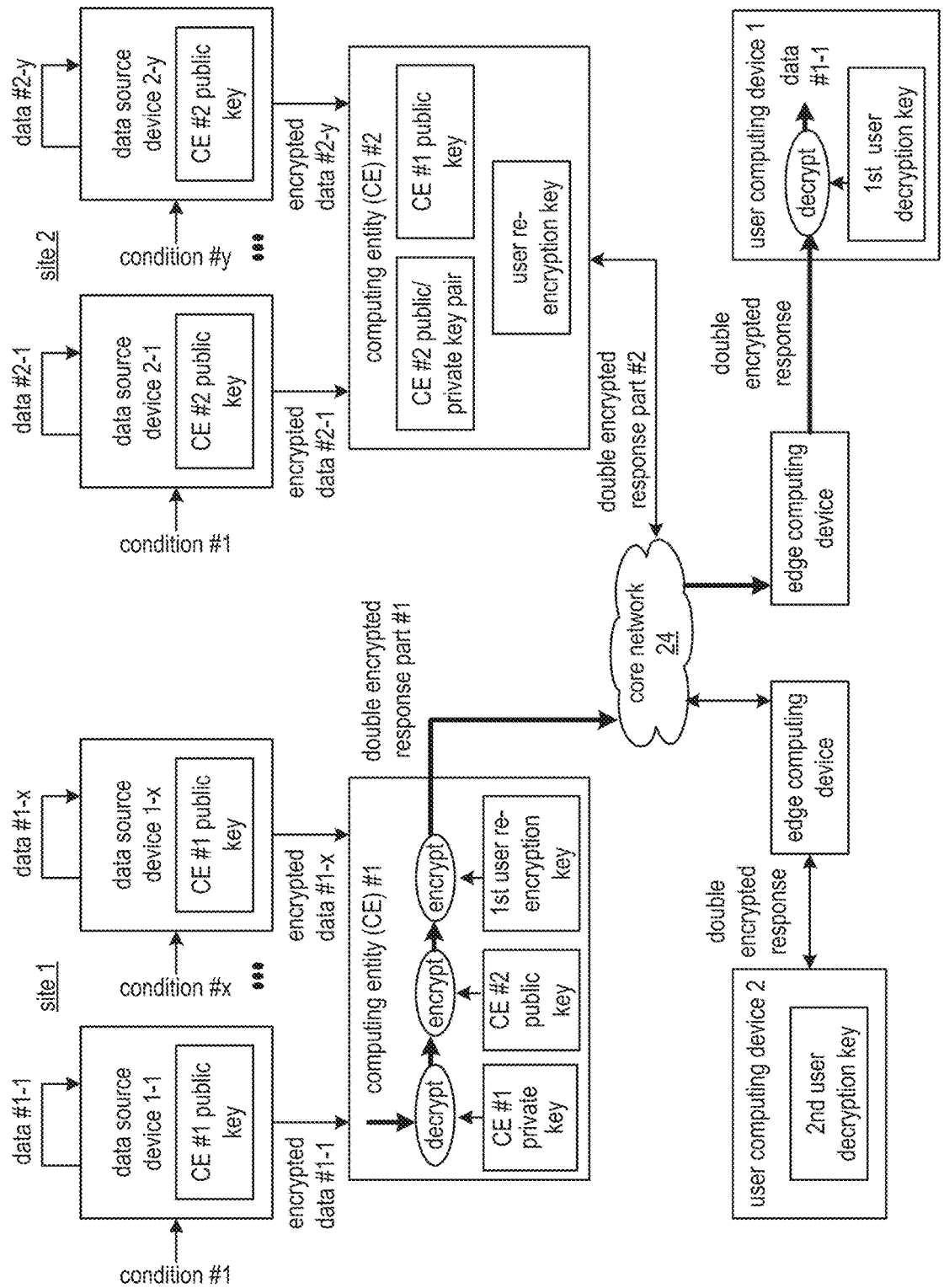

FIGS. 5A and 5C are schematic block diagrams of an embodiment of a secure data network illustrating methods to securely provide message brokering. The secure data network includes data source devices 1-1 through 1-x at a first site and data source devices 2-1 through 2-y at a second site. The data source devices may be implemented utilizing the data source device 26 of FIG. 1A. The data source devices monitor associated conditions to generate data. The data source devices encrypt the data to produce encrypted data providing security as the data traverses the secure data network.

The secure data network further includes a first computing entity and a second computing entity associated with the first and second sites respectively. Each computing entity may be implemented to include one or more of the site computing device 28 of FIG. 1A and the edge computing device 14 of FIG. 1A. The computing entities receive the encrypted data from the data source devices for further processing to produce double encrypted data for the traversing of the secure data network.

The secure data network further includes the core network 24 of FIG. 1, further edge computing devices (e.g., implemented separately or as part of one or more of the first and second computing entities), and a first and second user computing device. The first and second user computing devices may be implemented utilizing at least one of the data processing user computing device 18 of FIG. 1A and the end-user computing device 20 of FIG. 1A. The user computing devices receive the double encrypted data and decrypt the double encrypted data to recover the data.

The encrypting, processing of encrypted data, and decrypting utilizes a variety of cryptology approaches (e.g., encryption algorithms, encryption key generation techniques, encryption key affiliations) to provide security of the secure data network. Generally, each user computing device establishes a group of encryption keys with one of the computing entities. The group of encryption keys is identified and utilized when one of the user computing devices accesses data of either of the sites. For example, the group of encryption keys established between the second computing entity and the first user computing device are taking into account when the first user device accesses data from site one through the first computing entity. Specific examples of the utilization of the cryptology approaches within the secure data network are discussed in greater detail for instances of each of the two user computing devices accessing data in FIGS. 5A-5C.

FIG. 5A illustrates several examples of operation of the secure brokering provided by the secure data network. In a first example, the user computing device 1 desires to access data from the first site. The computing entity #1 receives a request for data #1-1 from data source device 1-1 that is affiliated with the computing entity #1 by user computing device 1. For instance, the user computing device 1 issues, via the edge computing device and the core network 24, the request to the computing entity #1.

The data source device 1-1 encrypts the data #1-1 using a CE #1 (computing entity #1) public key of a CE #1 public/private key pair of the computing entity #1 to produce encrypted data #1-1. The computing entity #1 generates the CE #1 public/private key pair utilizing a number of standard industry asymmetric encryption key generation algorithms (e.g. RSA, Diffie-Hellman, elliptical curve, etc.). Key pairs are generated to include a public key and a private key, where data that is encrypted utilizing one key of the key pair must utilize the other key of the key pair to decrypt the data. Having generated the CE #1 public key, the computing entity #1 distributes the CE #1 public key to each data source 1-1 through 1-x affiliated with the computing entity #1 to enable subsequent encryption of data from each of the data source devices.

Having received the request, the computing entity #1 determines whether a re-encryption key of the user computing device #1 is based on the CE #1 public/private key pair of the computing entity #1. The re-encryption key is generated utilizing an industry standard proxy encryption approach. One such generation approach is discussed in greater detail with reference to FIG. 5B.

FIG. 5B illustrates an example of generating the re-encryption key for the user computing device 1, where the computing entity #2 generates the re-encryption key. The computing entity #2 generates the re-encryption key for any user computing device requesting data from the computing entity #2 (e.g., from site 2) for the first time (e.g., when the user computing device does not have a re-encryption key). Alternatively, or in addition to, the computing entity #1 generates the re-encryption key for any user computing device requesting data from the computing entity #1 (e.g., from site 1) for the first time.

Prior to establishing the re-encryption key, the computing entity #2 generates a CE #2 public/private key pair to include a CE #2 public key and a CE #2 private key. The generating typically coincides with an initial activation of the computing entity #2.

When the computing entity #2 generates the re-encryption key for the user computing device 1 (e.g., first time data request), the computing entity #2 generates a key generating seed based on a user computing device 1 identifier (ID) when identity-based encryption is utilized. The identifier can be any combination of a hardware ID, a software ID, a virtual ID, a network address, and email address, etc. The identifier may be further combined with a master public key utilized by a trust system of the secure data network (e.g., that establishes root level signature trust of an industry trust approach).

Having generated the seed, the computing entity #2 applies the seed to a key generator 0 (e.g., an industry key generating algorithm) to generate a public/private key pair for the user computing device 1. The computing entity #2 applies a public key of the public/private key pair of the user computing device 1 along with the CE #2 private key to a key generator 1 (e.g., an industry proxy key generating algorithm) to produce a first user re-encryption key for the user computing device 1. The private key of the public/private key pair of the user computing device 1 serves as a first user decryption key.

In another example of the generating of the re-encryption key, the computing entity #1 generates the re-encryption key when the user computing device 1 issues a first request for data, from any of the data source devices, to the computing entity #1. In a similar fashion, the computing entity #1 applies the keygen 1 to generate the re-encryption key for the user computing device 1 utilizing the CE #1 private key of the computing entity #1 public/private key pair and the public key of the user computing device 1.

Returning to the discussion of the example of operation illustrated by FIG. 5A, the computing entity #1 determines whether the re-encryption key of the user computing device 1 is based on the CE #1 public/private key pair of the computing entity #1 by one of at least two approaches. A first approach includes indicating that the re-encryption key of the user computing device 1 is not based on the CE #1 public/private key pair of the computing entity #1 when detecting at least one of a variety of scenarios.

In a first scenario, the computing entity #1 detects that a public key of the request for data #1-1 compares unfavorably to the CE #1 public key of the CE #1 public/private key pair of the computing entity #1, when the request includes the public key. For instance, the public key included with the request is that of the computing entity #2.

In a second scenario, the computing entity #1 detects that an identifier of the user computing device 1 compares unfavorably to an entry of a list of identifiers of user computing devices affiliated with the computing entity #1. For instance, the list of identifiers does not include the identifier of the user computing device 1.

In a third scenario, the computing entity #1 detects that an identifier of a key generating authority utilized to generate the re-encryption key of the user computing device 1 compares unfavorably to an identifier of the computing entity #1.

For instance, the identifier of the key generating authority does not match the identifier of the computing entity #1.

A second approach to determining whether the re-encryption key of the user computing device 1 is based on the CE #1 public/private key pair of the computing entity #1 includes indicating that the re-encryption key of the user computing device 1 is based on the CE #1 public/private key pair of the computing entity #1 when detecting at least one of a variety of further scenarios.

In a first further scenario, the computing entity #1 detects that the public key of the request for data #1-1 compares favorably to the CE #1 public key of the CE #1 public/private key pair of the computing entity #1. For instance, the public key included with the request substantially matches that of computing entity #1.

In a second further scenario, the computing entity #1 detects that the identifier of the user computing device 1 compares favorably to the entry of the list of identifiers of user computing devices affiliated with the first computing entity. For instance, the list of identifiers includes the identifier of the user computing device 1.

In a third further scenario, the computing entity #1 detects that the identifier of the key generating authority utilized to generate the re-encryption key of the user computing device 1 compares favorably to the identifier of the computing entity #1. For instance, the identifier of the key generating authority substantially matches the identifier of the computing entity #1.

When the re-encryption key of the user computing device 1 is not based on the CE #1 public key of the CE #1 public/private key pair of the computing entity #1, the computing entity #1 utilizes the CE #2 public key and the user re-encryption key for the user computing device 1 to process the encrypted data #1-1 to produce double encrypted data of a double encrypted response part #1. When the re-encryption key of the user computing device 1 is based on the CE #1 public key of the CE #1 public/private key pair of the computing entity #1, the computing entity #1 utilizes the user re-encryption key for the user computing device 1 to process the encrypted data #1-1 to produce the double encrypted data of the double encrypted response part #1. In a similar way, the computing entity #2 utilizes the user re-encryption key for the user computing device 1 to process encrypted data of site 2 to produce further double encrypted data of a double encrypted response part #2 for the user computing device 1.

Having generated the double encrypted data, the computing entity #1 sends, via the core network 24 and one or more edge computing devices, the double encrypted response part #1 to the user computing device 1 for decryption utilizing the first user decryption key to recover the data #1-1. The processing of the encrypted data #1-1 to produce the double encrypted data is discussed in greater detail with reference to FIG. 5C.

FIG. 5A further illustrates a second example of operation of the secure brokering provided by the secure data network. In the second example, the user computing device 2 desires to access the data #1-1 from the first site. The computing entity #1 receives a second request for the data #1-1 by the user computing device 2. The computing entity #1 determines whether a second re-encryption key of the user computing device 2 is based on the CE #1 public/private key pair of the computing entity #1.

When the second re-encryption key of the user computing device 2 is not based on the CE #1 public/private key pair of the computing entity #1, the computing entity #1 decrypts the encrypted data #1-1 using the CE #1 private key of the CE #1 public/private key pair to recover the data #1-1. Having recovered the data #1-1, the computing entity #1 encrypts the data #1-1 using a third public key of a third computing entity of the secure data network to produce third encrypted data, where the second re-encryption key of the user computing device 2 is based on a third key pair of the third computing entity. For instance, previously, the third computing entity processed a first ever data request from the user computing device 2 and utilized the keygen 1 to generate the second re-encryption key based on a private key of the third key pair and a public key of a public/private key pair of the user computing device 2.

Having produced the third encrypted data, the computing entity #1 encrypts the third encrypted data with the second re-encryption key of the user computing device 2 to produce second double encrypted data. The computing entity #1 sends, via the core network 24 and one or more edge computing devices, the second double encrypted data to the user computing device 2. The user computing device 2 is capable of decrypting the second double encrypted data using a private key of the user computing device 2 to recover the data #1-1. The private key of the second user computing device is paired with the public key of the user computing device 2 and the second re-encryption key of the user computing device 2 is further based on the public key of the user computing device 2.

When the second re-encryption key of the user computing device 2 is based on the CE #1 public/private key pair of the computing entity #1, the computing entity #1 encrypts the encrypted data #1-1 with the second re-encryption key of the user computing device 2 to produce the second double encrypted data. Having produced the second double encrypted data, the computing entity #1 sends, via the core network 24 and one or more edge computing devices, the second double encrypted data to the user computing device 2.

FIG. 5C further illustrates the first example of operation of the secure brokering provided by the secure data network. In particular, the processing of the encrypted data #1-1 to produce the double encrypted data includes, when the re-encryption key of the user computing device 1 is not based on the CE #1 public key of the CE #1 public/private key pair of the computing entity #1, the computing entity #1 decrypts the encrypted data #1-1 using the CE #1 private key to recover the data #1-1.

The computing entity #1 encrypts the data #1-1 using the CE #2 public key of the computing entity #2 to produce second encrypted data (e.g., encrypted data #1-1 based on the public key of the second computing entity), when the re-encryption key of the user computing device 1 is based on the CE #2 public/private key pair of the computing entity #2. The computing entity #1 determines that the re-encryption key of the user computing device 1 is based on the CE #2 public/private key pair of the computing entity #2 when detecting at least one pattern. A first pattern includes detecting that a public key of the request for the data #1-1 compares favorably to the CE #2 public key of the CE #2 public/private key pair of the computing entity #2. For instance, the public key of the request is substantially the same as the CE #2 public key.

A second pattern includes detecting that an identifier of the user computing device 1 compares favorably to an entry of a list of identifiers of user computing devices affiliated with the computing entity #2. For instance, the identifier of the user computing device 1 is included in the list of identifiers affiliated with the computing entity #2.

A third pattern includes detecting that an identifier of a key generating authority utilized to generate the re-encryption key of the user computing device 1 compares favorably to an identifier of the computing entity #2. For instance, the identifier of the computing entity #2 is substantially the same as the identifier of the key generating authority.

Having produced the second encrypted data, the computing entity #1 encrypts the second encrypted data with the first user re-encryption key to produce the double encrypted data as the double encrypted response #1. Having produced the double encrypted data, the computing entity #1 sends, via the core network 24 and one or more edge computing devices, the double encrypted data to the user computing device 1. The user computing device 1 is capable of decrypting the double encrypted data using the private key of the user computing device 1 (e.g., a first user decryption key) to recover the data #1-1.

In another example, the processing of the encrypted data #1-1 to produce the double encrypted data includes, when the re-encryption key of the user computing device 1 is based on the CE #1 public/private key pair of the computing entity #1, the computing entity #1 encrypts the encrypted data #1-1 with the re-encryption key of the user computing device 1 to produce the double encrypted data. Having produced the double encrypted data, the computing entity #1 sends the double encrypted data to the user computing device 1.

The examples described above in conjunction with a processing module of any of the first computing entity, the second computing entity, the third computing entity, and user computing device, can alternatively be performed by other modules of the secure data network of FIGS. 1A, 1B, 1C, 1D, 1E, 5A, 5B and 5C or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing entities and/or computing devices of the secure data network, cause the one or more computing entities and/or computing devices to perform any or all of that described above.

Figure 6:
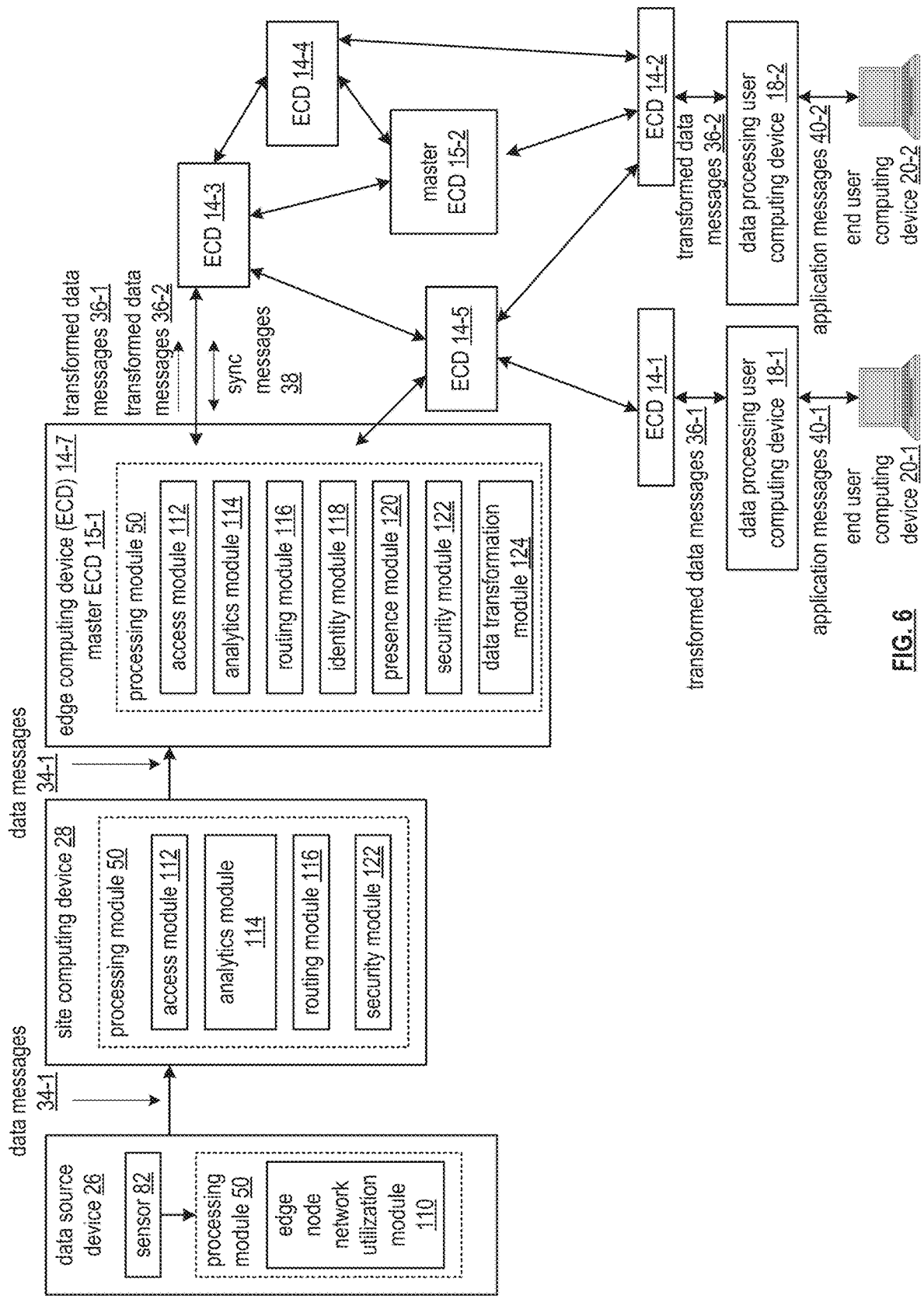
FIG. 6 is a schematic block diagram of another embodiment of a secure data network in accordance with the present invention.

FIG. 6 is a schematic block diagram of another embodiment of a secure data network that includes a data source device 26, a site computing device 28, a plurality of edge computing devices 14-1 through 14-7, master edge computing devices 15-1 and 15-2, at least two data processing user computing devices 18-1 and 18-2, and at least two end user computing devices 20-1 and 20-2. The data source includes data source device 26 may include one or more of the devices and the modules of the data source device 26 of FIG. 3. For example, the data source device 26 includes the sensor 82 and the processing module 50 of FIG. 3. The processing module 50 of the data source device 26 includes an edge node network utilization module 110. The site computing device 28 includes the processing module 50 of FIG. 2 and the processing module 50 includes an access module 112, a routing module 116, a security module 122, and an analytics module 114.

Each edge computing device of the plurality of edge computing devices 14-1 through 14-7 includes one or more of the devices and the modules of the edge computing devices of FIG. 2. For example, each edge computing device includes the processing module 50 of FIG. 2, where the processing module 50 includes the access module 112, the analytics module 114, the routing module 116, an identity module 118, a presence module 120, the security module 122, and a data transformation module 124. The edge node network utilization module 110 includes one or more of the functions associated with the edge computing devices 14-1 through 14-7. For instance, the edge node network utilization module 110 includes the access module 112, the identity module 118, and the security module 122. Each of the master edge computing devices 15-1 and 15-2 further operate to distribute any operational information required for the secure data network. For instance, information to establish routes and establish security credentials that is not readily available by the edge computing devices (e.g., a master routing table maintained by the master edge computing devices).

Generally, the modules 112-124 within the processing modules 50 of the data source device 26, the site computing device 28, and the edge computing devices 14-1 through 14-7 process (e.g., generate, store, utilize for decision-making, transfer) synchronization parameters within synchronization messages 38 to maintain operation of the secure data network. For example, functionality of the access module 112 includes causing the processing module 50 to utilize one or more of protocol information and configuration information to provide physical access to other nodes and/or devices.

Functionality of the analytics module 114 includes causing the processing module 50 to utilize the analytics information to optimize generation and transmission of data messages and transformed data messages. Functionality of the routing module 116 includes causing the processing module 50 to utilize the routing information to optimize transmission of information through the edge computing devices.

Further examples of the processing include functionality of the identity module 118, which includes causing the processing module 50 to utilize the addressing information to identify which sensors are associated with which data source devices and which data source devices are to access which data processing user computing devices. Functionality of the presence module 120 includes causing the processing module 50 to utilize the presence information to optimize utilization of various edge nodes to optimize data traffic routes between the data source device and a corresponding data processing user computing device. Functionality of the security module 122 includes causing the processing module 50 to utilize security information to authenticate a desirable and valid connection between edge computing devices and data source devices and to protect confidential information exchange between the edge computing devices and data source devices.

Functionality of the data transformation module 124 includes causing the processing module 50 to utilize the protocol information to convert portions of the data messages into the transformed data messages to support multiple desirable attributes of the secure data network. The desired attributes include a favorable security level, a favorable efficiency level, a favorable data latency level, and a favorable compatibility level with numerous data protocols associated with data applications of the data processing user computing devices.

In an example of operation of the secure data network, the edge computing devices 14-1 through 14-7, the site computing device 28, and the data source device 26 exchange synchronization messages 38 from time to time to develop and convey the synchronization parameters. For example, at least some the edge computing devices 14-1 through 14-7 convey, by exchanging with each other, at least some of the synchronization parameters to include one or more of the configuration information, the analytics information, the protocol information, the addressing information, the security information, the routing information, and the presence information. For instance, edge computing device 14-1 receives one or more of the synchronization patterns from the data processing user computing device 18-1 for local storage within a memory of the edge computing device 14-1, where a trusted edge computing device control application of the data processing user computing device 18-1 is affiliated with the plurality of edge computing devices 14-1 through 14-7. In another instance, edge computing device 14-1 generates a synchronization message 38 to include substantially all of the synchronization parameters and transmits the synchronization message 38 to the edge computing device 14-6 to update the synchronization parameters stored locally within a memory of the edge computing device 14-6.

As another example of the developing and conveying of the synchronization parameters, at least some of the edge computing devices 14-1 through 14-7, the site computing device 28, and the data source device 26 develop, by generating with each other (e.g., determining, modifying, updating, correcting, etc.), at least some of the synchronization parameters to include one or more of the configuration information, the analytics information, the protocol information, the addressing information, the security information, the routing information, and the presence information. For instance, the site computing device 28 exchanges limited security information (e.g., to lead to generation of a common secret encryption key) with the data source device 26 to further develop trusted security between the site computing device 28 and the data source device 26.

In another instance, the site computing device 28 receives configuration information from the data source device 26, where the configuration information includes addressing information associated with the sensor 82, and receives companion configuration information from a data application associated with the data processing user computing device 18-1 to match the sensor with the data application to generate further updated configuration information. In yet another instance, the edge computing device 14-7 monitors data messages received from the site computing device 28 to generate updated analytics information based on data attributes of data within the data messages (e.g., data types, data sizes, etc.).

Having developed and conveyed a sufficient number and sufficient level of the synchronization parameters to support ongoing operations, the secure data network facilitates communication of data from the sensor 82 to one or more corresponding data applications of the data processing user computing devices 18-1 and 18-2. In an example of operation of the communication of the data, having established trust and security information between the data source device 26 and the site computing device 28, the site computing device 28 receives data messages 34-1 from the data source device 26, where the edge node network utilization module 110 encodes data from the sensor 82 in accordance with a sensor data protocol to produce the data messages 34-1. The encoding of the data includes utilizing at least one of an industry standard sensor data protocol and a proprietary data protocol. The industry standard sensor data protocols include one or more of Message queue telemetry transport (MQQT), constrained application protocol (CoAP), and data distribution service (DDS).

Having received the data messages 34-1, the site computing device 28 identifies active data applications associated with the data processing user computing devices 18-1 and 18-2 that are affiliated with the data source device 26 and/or the sensor 82 based on one or more of the addressing information and the configuration information. Having identified the active data applications, the site computing device 28 determines at least a portion of a route for transferring data associated with the data messages 34-1 to the data processing user computing devices 18-1 and 18-2 based on one or more of the routing information and the presence information. Having determined the routing information, the site computing device 28 sends the data messages 34-1 to the edge computing device 14-7 in accordance with the routing information.

Having received the data messages 34-1, the edge computing device 14-7 determines whether to convert the data messages into transformed data messages based on one or more of the configuration information, the analytics information, the addressing information, and the protocol information. For instance, the edge computing device 14-7 determines to convert the data messages 34-1 from the sensor data protocol into first and second data message protocols when the protocol information indicates that the first and second data protocol messages are associated with the affiliated data applications of the data processing user computing devices 18-1 and 18-2.

In another instance, the edge computing device 14-7 determines to convert the data messages 34-1 from the sensor data protocol into a third data message protocol. The determining includes selecting the third data message protocol when the analytics information indicates that data optimization (e.g., providing important data on a more timely basis, estimating missing data based on historical data, summarizing multiple data points, etc.) based on the an interpretation of a data attribute (e.g., actual data, frequency of data transmission, a data type, etc.) of the data messages 34-1 is associated with the third data message protocol and the configuration information indicates that data processing user computing devices 18-1 and 18-2 are compatible with the third data message protocol.

Having determined to convert the data messages 34-1, the edge computing device 14-7 generates transformed data messages 36-1 and transformed data messages 36-2 from the data messages 34-1 based on attributes of the first and second data message protocols of the protocol information. Having generated the transformed data messages, the edge node 14-7 obtains the route for transferring the transformed data messages to the corresponding cloud services. The obtaining may include retrieving route information and updating the retrieve route information based on one or more of updated presence information, updated security information, and updated routing information.

In an instance of obtaining the route, the edge computing device 14-7 determines an updated route to include sending the transformed data messages to the edge computing device 14-3 when the updated presence information and updated routing information are favorable with regards to utilizing the edge computing device 14-3 and sending the transformed data messages 36-1 and 36-2 to the edge computing device 14-3. Alternatively, the edge computing device 14-7 transmits the transformed data messages 36-1 and 36-2 directly to the data processing user computing devices 18-1 and 18-2 via the core network 24 of FIG. 1 when attributes of the routing information are favorable for that route.

Having received the transformed data messages 36-1, the edge computing device 14-1 facilitates forwarding of the transformed data messages 36-1 to the data processing user computing device 18-1 for utilization by the corresponding data application affiliated with the data source device 26 and/or the sensor 82. Having received the transformed data messages 36-2, the edge computing device 14-2 facilitates forwarding of the transformed data messages 36-2 to the data processing user computing device 18-2 for utilization by the corresponding data application affiliated with the data source device 26 and/or the sensor 82.

Having processed the transformed data messages 36-1, the data processing user computing device 18-1 exchanges corresponding application messages 40-1 with the end-user computing device 20-1. Having processed the transformed data messages 36-2, the data processing user computing device 18-2 exchanges corresponding application messages 40-2 with the end-user computing device 20-2.

Figure 7A:
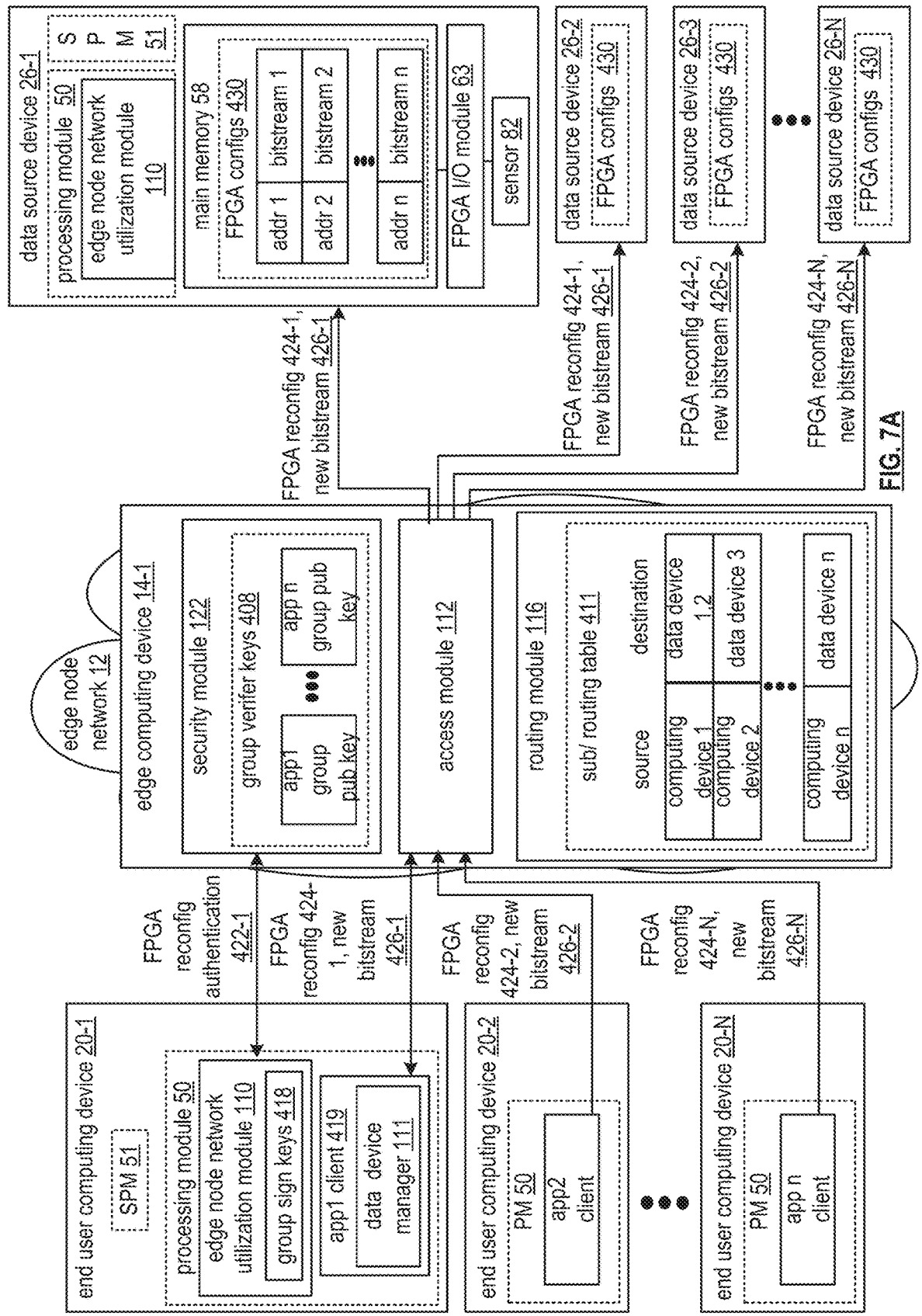
FIG. 7A is a schematic block diagram of another embodiment of a secure data network in accordance with the present invention.

FIG. 7A is a schematic block diagram of another embodiment of a secure data network that illustrates the scalable secure reconfiguration of the field programmable gate array (FPGA) within deployed data devices, in accordance with the present invention. The communication system includes data source devices 26-1 through 26-N of FIG. 6, end user computing devices 20-1 through 20-N of FIG. 1, and the edge node network 12 of FIG. 1.

Each data source device 26-1 through 26-N may include one or more of the devices and the modules of the data source device 26 of FIG. 6. For example, the data source devices 26-1 through 26-N includes sensor 82 of FIG. 3, the secure processing module 51 of FIG. 3, the processing module 50 of FIG. 3, where the processing module 50 includes the edge node network utilization module 110 of FIG. 6, a main memory 58 of FIG. 3, and the FPGA I/O module 63 of FIG. 3. The FPGA I/O module 63 is implemented as a logic device that can be reprogrammed to support new functionality related to the IOT mission of a data device, including supporting additional sensory processing tasks, decoder tasks and peripheral interfaces.

The main memory 58 includes FPGA configs 430 which is a partitioned allocation within the memory to support multiple programming configurations for FPGA I/O module 63. An FPGA programming configuration is generally referred to as a bitstream, and FPGA configs 430 stores multiple bitstreams (1-n) along with a starting address (addr 1-n) for each stored bitstream. On power up or re-flashing of a data device, FPGA I/O module 63, either on its own, or with the support of processing module 50, loads one of the bitstreams that in turn configures the FPGA for operation.

End user computing device 20-1 through 20-N includes one or more of the devices and the modules of the computing devices of FIG. 2. For example, the end user computing devices 20-1 through 20-N include the SPM 51, the processing module 50, where processing module 50 includes edge node network utilization module 110, and app 1 client 419, where app 1 client 419 includes a data device manager 111 responsible for controlling reconfiguration updates to the FPGA of the data source devices under management by the computing device. Edge node network utilization module 110 includes group sign keys 418, which together with the SPM 51 securely store a group member private key and a group member credential which are used to sign authentication messages (e.g., such as in a direct anonymous attestation operation).

The edge node network 12 includes at least edge computing device 14-1 of a possible plurality of edge nodes, where the edge computing device 14-1 includes one or more of the devices and the modules of the edge computing devices 14-1 through 14-7 of FIG. 6. For example, the edge computing device 14-1 includes the processing module 50 of FIG. 2, where the processing module 50 of the edge computing device 14-1 includes the access module 112 of FIG. 6, the routing module 116 of FIG. 6, and the security module 122 of FIG. 6. The modules function collectively to authenticate access to the edge node network, receive messages sourced from end user computing devices and data devices, and determine and facilitate routing, and replication if necessary, to the appropriate destination end user computing devices and data source devices as established by the message brokering approach.

The security module 122 provides a group verifier function which authenticates access by a computing device's application client to the edge node network, and includes group verifier keys 408, which maintains the group public encryption keys required to verify the group signatures generated by application groups associated to computing devices. Typically data messages, containing sensor data, flow from data source devices to applications on computing devices, however, for data device management purposes the flow must be reversed. So, in this case, routing module 116 provides a message brokering approach for this data device management purpose, by maintaining a reverse association, now between computing devices, operating as data device managers, and the data source devices subscribed to each data device manager.

The association is maintained in the sub/routing table 411 within routing module 116. Edge computing device 14-1 utilizes the table to determine to which data source devices to route data device management messages that were received, having been originally sourced by end user computing devices whose application clients are authenticated to manage a group of data source devices. Access module 112 provides external network interfaces, internal routing to security module 122 for authentication, and utilizes the sub/routing table 411 of routing module 116 for egress routing and replication when multiple data source devices require receipt of the same message.

In an example of operation of the secure data network, assume group key provisioning has taken place for each end user computing device 20-1 through 20-N, such that group sign keys 418 in each end user computing device is populated with the appropriate key and credential to generate a valid group signature (e.g., such as with direct anonymous attestation) for the group of data source devices their respective app clients (1-n) are managing. Secure processing module (SPM) 51 (e.g. a Trusted Platform Module) may optionally be utilized in a computing device, together with processing module 50, to wrap and more securely store these keys. Also assume that the association between computing devices, operating as data device managers, as the data source devices that each manage has been established in the message brokering approach provided by the edge node network 12.

In this example, data device manager 111, within end user computing device 20-1, operating as a device manager for data source devices 26-1 and 26-2, determines whether an FPGA reconfiguration is necessary for these data source devices. Having determined that a reconfiguration is necessary, data device manager 111, operating together with edge node network utilization module 110 of end user computing device 20-1, initiates an FPGA re-configuration authentication 422-1 handshake with the security module 122 or edge computing device 14-1, for which the end user computing device 20-1 must include a digital signature generated using group sign keys 418.

Utilizing an industry direct anonymous attestation verification process and group verifier keys 408, the security module 122 within edge node 14-1 verifies the FPGA reconfig authentication 422-1 handshake. The routing module 166 enables the end user computing device listed within the sub/routing table 411 to issue a management command to the data source devices for which it is associated in the table.

End user computing device 20-1 forms the FPGA reconfig 424-1 command, which includes a memory address for the FPGA bitstream within data source device FPGA configs 430 that the data source device is to be reconfigured with, or an indication that a new bitstream is to be subsequently sent to the data source device and replace the FPGA bitstream at the indicated address location. The FPGA reconfig 424-1 command further includes an integrity check (e.g., hash value) for the bitstream file once it is received. The command may also include a time at which the reconfiguration should take place to allow synchronized upgrade by all managed data devices.

In a first example, having formed a reconfiguration command indicating a memory address (addr 2) for bitstream 2, the end user computing device 20-1 sends the message to edge computing device 14-1 where it is received. Having received the FPGA reconfig 424-1 command, access module 112 within edge computing device 14-1, interprets the source of the message, associates it with an end user computing device, consults routing module 116 to verify that a reverse message brokering route is enabled for the end user computing device to the one or more data source devices it manages. For this example, "computing device 1", corresponding to end user computing device 20-1 within the table, is associated with "data source devices 1 and 2", corresponding to data source device 26-1 and data source device 26-2, respectively.

The access module 112 of the edge node replicates the FPGA reconfig 424-1 command, and sends the command to both data source device 26-1 and data source device 26-2. Having received the command, data source devices 26-1 and 26-2 interpret the command, verify the integrity value for bitstream2, extract the time if provided at which the upgrade should take place, wait for that time to arrive, and then instruct their respective FPGA I/O modules 63 to load bitstream2 from FPGA configs 430 within main memory 58, and to restart in order to complete the reconfiguration.

Similarly when end user computing device 20-2 managing data source device 26-3 (data device 3 in table), and end user computing device 20-N managing data source device 26-N (data device n in table) determine that a FPGA reconfiguration is necessary for their managed device, the end user computing devices authenticate with FPGA reconfiguration authentication handshakes, and command their managed data source devices to reconfigure with FPGA reconfig 424-2, and 424-N commands, respectively. Similarly, data source devices 26-3 and 26-N, respond to the commands, as did data source devices 26-1 and 26-2 from their computing devices, operating as data device managers.

In a second example, having formed a reconfiguration command indicating a new FPGA bitstream is to follow in a set of subsequent messages, end user computing device 20-1 sends this reconfiguration message to edge computing device 14-1 where it is received. Edge computing device 14-1 processes this reconfiguration command message exactly as is done in the first example, and the command is received by both data source device 26-1 and 26-2.

Having received the command, data source device 26-1 interprets the command, extracts and stores the integrity value for the subsequent arriving FPGA bitstream, extracts and stores the time if provided at which the upgrade should take place, optionally responds to the end user computing device that it is ready to accept the new bitstream, and waits for the new bitstream to arrive. As the new FPGA bitsteam arrives it may replace bitstream2, as identified by the memory address location (addr 2 in this example).

End user computing device 20-1 begins to send the FPGA bitstream in what may be multiple new bitsteam 426-1 data messages. Edge node 14-1 processes these messages just as was done for the command message, with the new bitstream 426-1 messages arriving at data source devices 26-1 and 26-2 until the entire bitstream has been received.

Data source devices 26-1 and 26-2 verify the integrity check on the received bitstream file, wait for the reconfiguration time to arrive if one was provided, and then instruct their FPGA I/O modules 63 to load the newly received FPGA bitstream from FPGA configs 430 within main memory 58 and to restart in order to complete the reconfiguration. Similarly, end user computing device 20-2 managing data source device 26-3 (data device 3 in table), and end user computing device 20-N managing data source device 26-N (data device n in table) would follow the same process with data source devices 26-3 and 26-N, receiving a new FPGA bitstream and responding with an appropriate reconfiguration of their FPGAs.

Figure 7B:
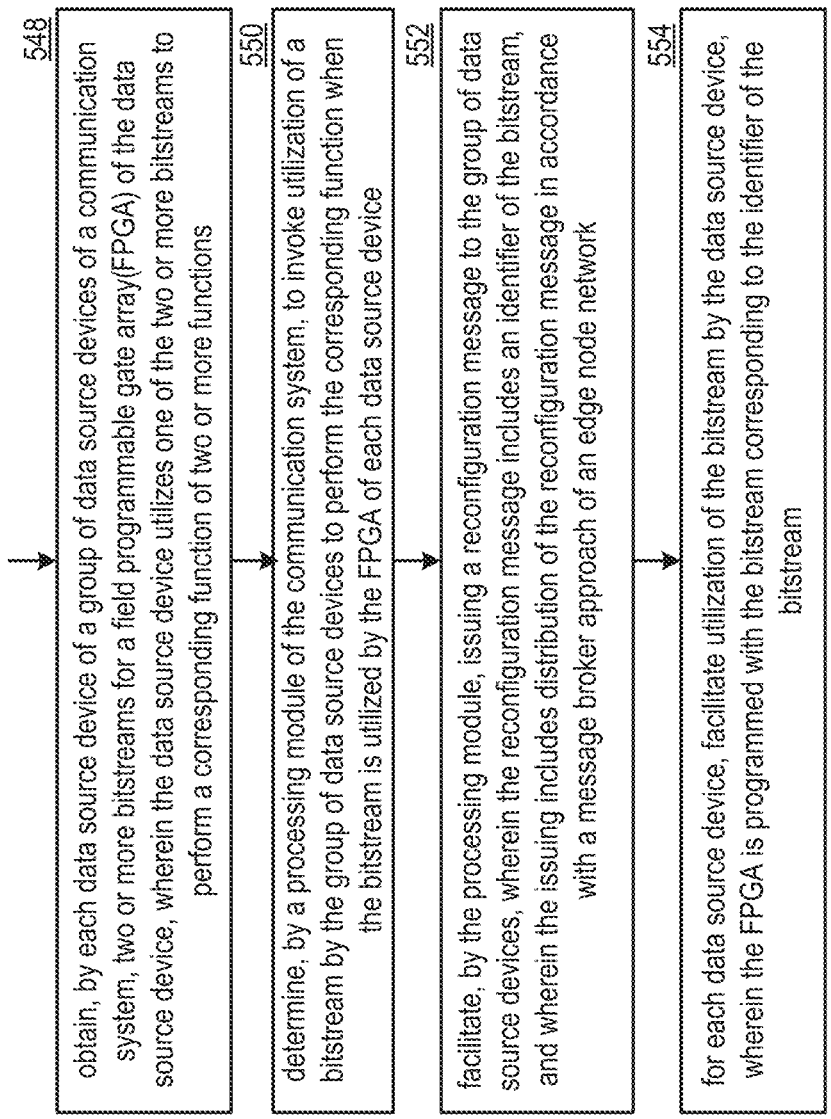
FIG. 7B is a logic diagram of an embodiment of a method for securely reconfiguring deployed field programmable gate arrays at scale in a secure data network in accordance with the present invention.

FIG. 7B is a logic diagram of an embodiment of a method for securely reconfiguring deployed field programmable gate arrays at scale in a secure data network. In particular, a method is presented for use in conjunction with one or more functions and features described in conjunction with FIGS. 1-5, 7A, and also FIG. 7B. The method includes step 548, where each data source device of a group of data source devices of a communication system obtain two or more bitstreams for a field programmable array (FPGA) of the data source device, where the data source device utilizes one of the two or more bitstreams to perform a corresponding function of two or more functions.

The obtaining of the two or more FPGA bitstreams may include the pre-provisioning, by a local computing device, of the bitstreams within the memory of each data source device utilizing a memory address to identify the start of each bitstream file. The utilization of the two or more bitstreams by the data source device include each bitstream performing a unique function or enhancement for the data source device that enables support for new sensory processing capabilities, additional interface functionality, improved processing performance, improved reliability, etc.

The method continues at step 550, where the processing modules of the communication system determines to invoke utilization of a bitstream by the group of data source devices to perform the corresponding function when the bitstream is utilized by the FPGA of each data source device. The determining includes interpreting an invocation request from an authenticated data device manager function to command a group of data source devices to reconfigure to another FPGA bitstream file. The authenticating of the invocation request may include generation of a group signature by the data device manager using provisioned group signing keys and subsequent verification by the a group verifier function in the edge node network that the signature is valid by utilizing the group public key, or may use any other authentication mechanism to verify the validity of the invocation request.

The determining may also include recognition by any one of the data source devices, the data device manager or the edge node network that a new interface capability is required to support additional sensors, or that a new decoder algorithm for an anticipated received media file is required. The determining may further include recognition by any one of the data devices, the data device manager or the edge node network that the FPGA bitstream operating on the data source device is faulty and outside established performance guidelines, and that invocation of a new bitstream is required.

The method continues at step 552, where the processing module facilitates issuing a reconfiguration message to the group of data source devices, where the reconfiguration message includes an identifier of the bitstream, and where the issuing includes distribution of the reconfiguration message in accordance with a message broker approach of an edge node network. The issuing may include a reconfiguration message that identifies a memory address of the location of the pre-provisioned FPGA bitstream file resident in memory on the data source device. The identifying the bitstream may also include communicating a name for the bitstream.

The distribution of the two or more FPGA bitstreams by each data source device, may include the processing of transmissions by a remote device manager and receiving by each data source device of a new FPGA bitstream file where the data messages transporting the bitstream file are routed and replicated by an edge node network supporting a reverse message brokering approach in which subscribed computing devices, operating as device managers, are the source rather than the destination of data messages (containing the bitstream file) and the data source devices are the destinations, rather than the source of data messages. As an example, a subscription/routing table within an edge node of the edge node network is used to associate device managers with one or more managed data source devices and can be used to provide scalable message routing and distribution of both reconfiguration commands and messages transporting new bitstreams.

The method continues at step 554, where for each data device, the data source device facilitates utilization of the bitstream, where the FPGA is programmed with the bitstream corresponding to the identifier of the bitstream. The facilitation of the utilization of the FPGA bitstream includes the processing module of the data source device interpreting the identifier for the bitstream within the invocation command in order to locate the corresponding bitstream file, verifying the integrity of the bitstream file using an integrity check (e.g. such as known or communicated hash value for the file) and extracting the upgrade date and time if provided at which the upgrade should take place. The facilitating further includes waiting for that time to arrive, and then instructing the FPGA module device to load the bitstream from the identified location and perform a restart to complete the reconfiguration process and begin operating with the new functionality provided by the bitstream.

In an embodiment, the identifying of the FPGA bitstream in the invocation command includes conveying the memory address location of the bitstream in the memory of the data source device, conveying a name of the bitstream, and conveying a term that is relative to the currently operating bitstream (e.g., "next", "$2^{nd}$ for current", etc.). As a result, the data source device is enabled to identify and select the appropriate FPGA bitstream to be loaded in the FPGA module device on a restart.

The methods described above in conjunction with the processing module can alternatively be performed by other modules of the secure data network 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers) of the secure data network 10, cause the one or more computing devices to perform any or all of the method steps described above.

Figure 8A:
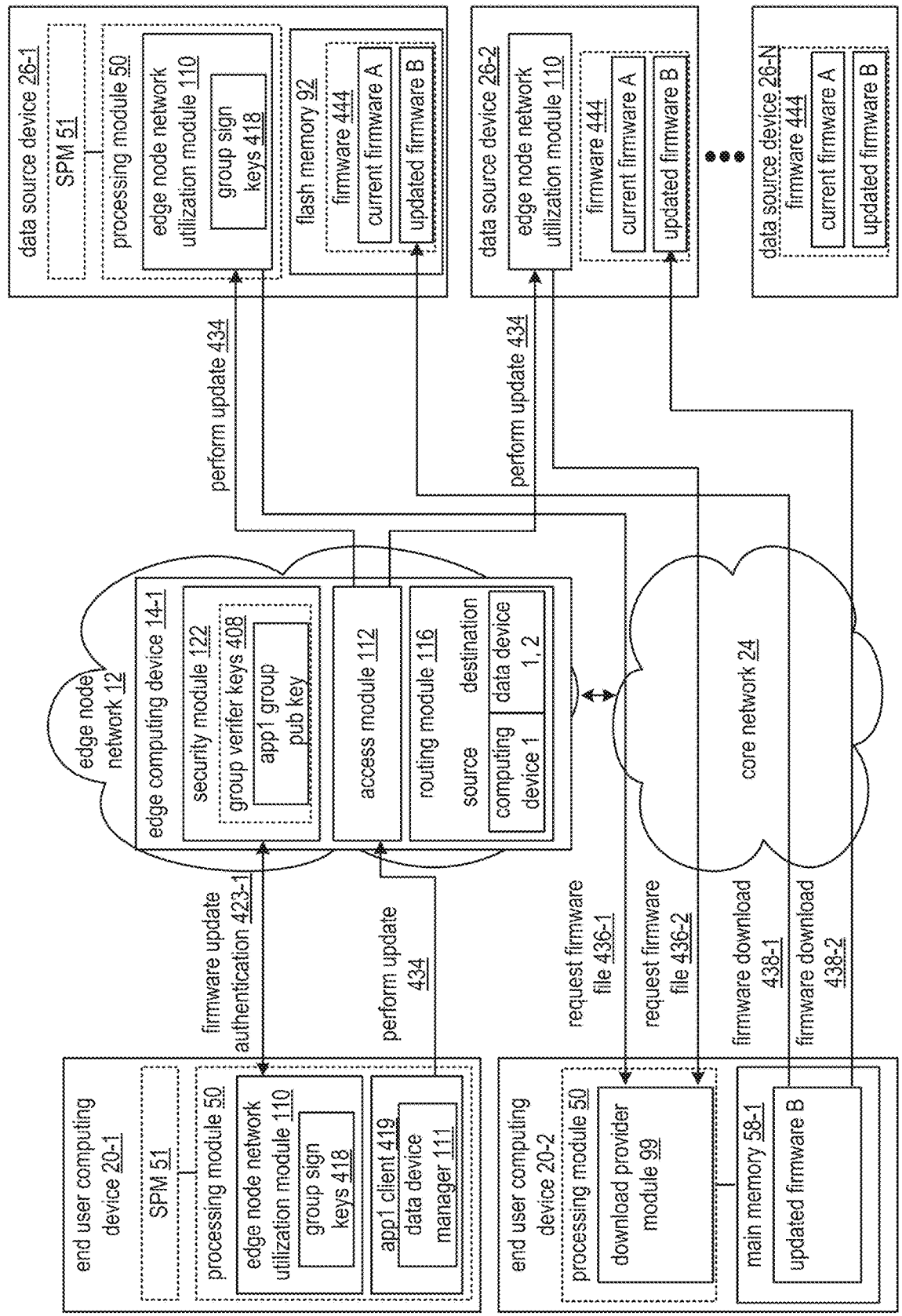
FIG. 8A is a schematic block diagram of another embodiment of a secure data network in accordance with the present invention.

FIG. 8A is a schematic block diagram of another embodiment of a secure data network that illustrates authenticated firmware downloads using a secure out-of-band channel in accordance with the present invention. The secure data network includes data source devices 26-1 through 26-N of FIG. 6, end user computing devices 20-1 and 20-2 of FIG. 2, the edge node network 12 of FIG. 1, and the core network 24 of FIG. 1, where core network 24 includes at least one of the Internet, a broadband public radio access network (RAN), and any private broadband network.

Each data source device 26-1 through 26-N may include one or more of the devices and the modules of the data source device 26 of FIG. 6. For example, the data source devices 26-1 through 26-N includes the processing module 50 of FIG. 3, where processing module 50 includes the edge node network utilization module 110 of FIG. 6, a secure processing module (SPM) 51 of FIG. 3, and a flash memory 92 of FIG. 2, where flash memory 92 includes firmware 444 which retains the current firmware A operating on the data source device, and a location to retain updated firmware B.

On power up or restart of a data source device, the processing module 50 loads current firmware A into main memory and begins operation, except if a firmware update is resident and enabled, in which case processing module 50 loads updated firmware B into main memory and begins operation. Edge node network utilization module 110 includes group sign keys 418, which are provisioned with a group member private key and group member credential which are utilized to encrypt and form group signatures necessary for authenticating access to the edge node network 12.

The end user computing devices 20-1 and 20-2 may include one or more of the devices and the modules of the computing devices of FIG. 2. For example, the end user computing device 20-1 includes processing module 50, where processing module 50 includes edge node network utilization module 110, and applclient 419, where applclient 419 includes a data device manager 111 responsible for controlling firmware updates to the data source devices under management by the end user computing device. Edge node network utilization module 110 includes group sign keys 418, which together with the optional secure processing module (SPM) 51 securely store the group member private key and group member credential which are used to sign authentication messages (e.g., such as in a direct anonymous attestation operation).

End user computing device 20-2 includes processing module 50. The processing module 50 includes download provider module 99, which functions as a web server to support firmware downloads to data devices, utilizing main memory 58-1 which retains the updated firmware B file that is distributed to data devices.

The edge node network 12 includes at least edge computing device 14-1 of a possible plurality of edge computing devices, where the edge computing device 14-1 includes one or more of the devices and the modules of the edge computing devices 14-1 through 14-7 of FIG. 6. For example, the edge computing device 14-1 includes the processing module 50 of FIG. 2, where the processing module 50 of the edge computing device 14-1 includes the access module 112 of FIG. 6, the routing module 116 of FIG. 6, and the security module 122 of FIG. 6, which function collectively to authenticate access to the edge node network, receive messages sourced from end user computing devices and data devices, and determine and facilitate routing, and replication if necessary, to the appropriate destination end user computing devices and data source devices as established by the message brokering approach.

The security module 122 provides a group verifier function which authenticates access by end user computing devices and data source devices to the edge node network, and includes group verifier keys 408, which maintains the group public encryption keys required to verify the group signatures generated by application groups associated to end user computing devices. Typically data messages, containing sensor data, flow from data source devices to applications on computing devices, however, for data device management purposes the flow must be reversed. So, in this case, routing module 116 provides a message brokering approach for this data device management purpose, by maintaining a reverse association, now between end user computing devices, operating as data device managers, and the data source devices subscribed to each data device manager.

This association is maintained in the sub/routing table 411 within routing module 116. Edge computing device 14-1 utilizes the table to determine to which data source devices to route data device management messages that were received, having been originally sourced by end user computing devices whose application clients are authenticated to manage a group of data devices. Access module 112 provides the external network interfaces, the internal routing to security module 122 for authentication, and utilizes the sub/routing table 411 of routing module 116 for egress routing and replication when multiple data source devices require receipt of the same message.

In an example of operation of the communication system, end user computing device 20-2 is operably connected to core network 24 which supports broadband data transfers, while end user computing device 20-1 is operably connected to edge node network 12 (via edge computing device 14-1), which is capable of efficiently supporting a secure out-of-band channel for lower data rate traffic. Data source devices 26-1 and 26-2 are operably connected to both the core network 24 and edge network 12.

In this example, assume group key provisioning (such as with industry direct anonymous attestation) has taken place for end user computing device 20-1 and data source devices 26-1 and 26-2, being the data source devices that app1 client 419 and data device manager 111 is managing, such that all these devices are associated to a common group and such that group sign keys 418 in each device include an appropriate group member private key and credential to generate a valid group signature for this group. Secure processing module (SPM) 51 (e.g. a Trusted Platform Module) is utilized in a computing and data device, together with processing module 50, to wrap and more securely store these keys.

The data device manager 111 within end user computing device 20-1, operating as a device manager for data source devices 26-1 and 26-2, determines whether a firmware update is necessary for these data source devices. The determining may be based on a number of factors, including the availability of new firmware with enhanced features, or new firmware that patches a fault in the currently operating firmware.

Having determined that a firmware update is necessary, data device manager 111 operating together with edge node network utilization module 110 of end user computing device 20-1 initiates a firmware update authentication 422-1 handshake with the security module 122 or edge node 14-1. The user computing device 20-1 includes a digital signature generated using group sign keys 418.

Utilizing the direct anonymous attestation verification process and group verifier keys 408, the security module 122 within edge computing device 14-1 verifies the firmware update authentication 422-1 handshake and the end user computing device is enabled within the sub/routing table 411 within routing module 116 of the edge node to issue a management command to the data source devices within the common group using the message brokering approach of the edge node. Having successfully authenticated the firmware update and enabled edge computing device 14-1 to support a firmware update command, end user computing device 20-1 forms a perform update 434 command, which includes a location identifier (e.g., IP address, website URL, etc.) from which the updated firmware can be downloaded by the data source device, along with an integrity check (e.g., hash value) for the updated firmware file once it is received.

The command may also include a time at which the device should restart with the updated firmware to allow synchronized upgrade by all managed data devices. End user computing device 20-1 sends the command message to edge computing device 14-1 where it is received.

Having received the perform update 434 command, access module 112 within the edge computing device 14-1, interprets the source of the message, associates it with an end user computing device, consults routing module 116 to verify that a reverse message brokering route is enabled for the end user computing device to the one or more data source devices it manages. For this example and within the table, "computing device 1", corresponding to end user computing device 20-1, is associated with "data source devices 1 and 2", corresponding to data source device 26-1 and data source device 26-2, respectively.

The access module 112 of the edge node replicates the perform update 434 command, and sends the command to both data source device 26-1 and data source device 26-2. Having received the command, data source devices 26-1 and 26-2 interpret the command, extract the network location of the updated firmware, extract the integrity check value for the updated firmware file that is to be downloaded, and extract the time if provided at which the firmware upgrade should be executed.

Having received the upgrade command and extracted the contents, data source devices 26-1 and 26-2, send a request firmware file 436-1 and 436-2 messages, respectively, over the broadband-optimized, but less secure core network 24, to the end user computing device 20-2 at the extracted network location. Having received the requests for the updated firmware file B, processing module 50 of end user computing device 20-2 initiates the firmware file transfer to data source devices 26-1 and 26-2, utilizing firmware download 438-1 and 438-2 messages, respectively, to transport the updated firmware B file to these data source devices.

Having received the entire updated firmware B file, data source devices 26-1 and 26-2, utilizing the extracted contents from the firmware update command, verify the file contents using the integrity check value, wait for the update date and time to arrive if one was provided, and then perform a firmware upgrade restart in which the data source devices 26-1 and 26-2 utilize the updated firmware B for the restart in order to complete the authenticated firmware update process. The communication system couples the utilization of the edge node network as a secure out-of-band channel for the update command signaling, with the utilization of a less secure broadband network (such as the Internet) as a high performance, low latency download vehicle for large firmware files, thereby improving the security and performance of firmware updates for data source devices.

Figure 8B:
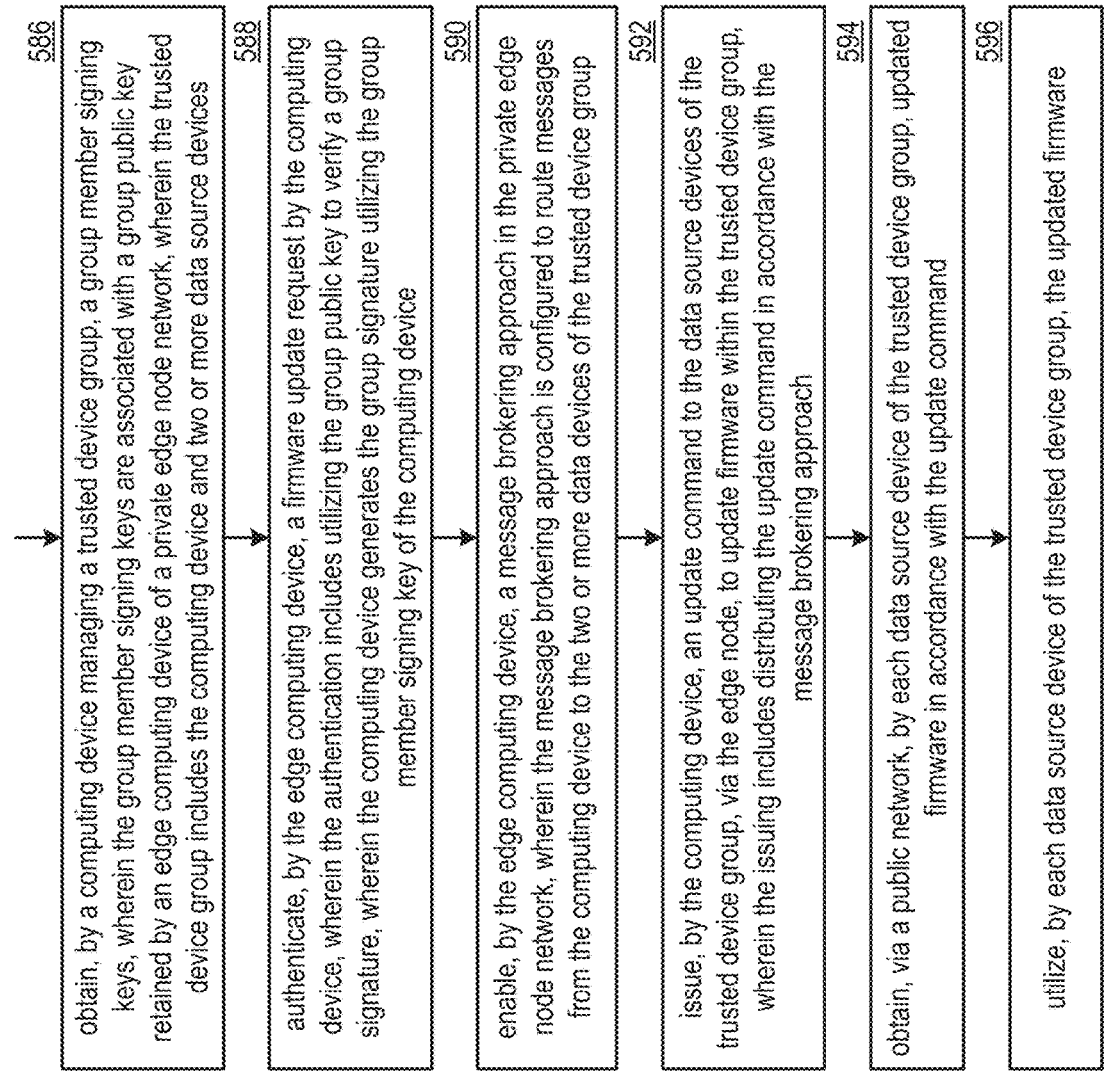
FIG. 8B is a logic diagram of an embodiment of a method for authenticating firmware downloads in a secure data network in accordance with the present invention.

FIG. 8B is a logic diagram of an embodiment of a method for authenticating firmware downloads in a secure data network. In particular, a method is presented for use in conjunction with one or more functions and features described in conjunction with FIGS. 1-5, 8A, and also FIG. 8B. The method includes step 586, where a computing device managing a trusted device group obtains group member signing keys, where the group member signing keys are associated with a group public key retained by an edge computing device of a private edge node network, and where the trusted device group includes the computing device and two or more data source devices.

The obtaining of the group signing keys includes the generating of a public group key and individual group member private keys, the storing of the public group key in a verifier function of an edge node, and the secure distribution of the group member private keys and credentials to one or more data source devices by a key issuer function in a premise-based or network-based edge node. The distributing of the common public encryption key may further be initiated by the data source device requesting a key provisioning handshake, or may be initiated by the key issuer node upon polling for data source devices that are not currently provisioned, with the key issuer node in either case securely issuing signing keys to authenticated devices. In another approach, the distributing of the group signing keys may include the pre-provisioning, by a local computing device, of the group signing keys within each device.

The method continues at step 588, where the edge computing device authenticates a firmware update request by the computing device, where the authentication includes utilizing the group public key to verify a group signature, where the computing device generates the group signature utilizing the group member signing key of the computing device. The authenticating of the firmware update request includes generation of a group signature by the computing device using the provisioned group signing keys (group member private key and credential), and subsequent verification by a group verifier function in the edge node network that the signature is valid by utilizing the group public key. As an example, the direct anonymous attestation verification process can be employed by an edge node verifier function.

The method continues at step 590, where the edge computing device enables a message brokering approach in the private edge node network, where the message brokering approach is configured to route messages from the computing device to the two or more data source devices of the trusted device group. The enabling includes establishing the two or more data source devices as the destination, and the computing device as the source, in the edge node routing table that composes the message brokering function.

As another approach, the enabling can leverage an existing message brokering relationship. The relationship includes the computing device being previously established as the destination for messages sourced by the data source devices in the message brokering approach by operating bi-directionally, so both as listed in the routing table as well as the reverse swap to the source and destination, such that messages from the computing device, as the source, will be distributed to the data source devices as the destination.

The method continues at step 592, where the computing device issues an update command to the data source devices of the trusted device group, via the edge node, to update firmware within the trusted device group, where the issuing includes distributing the update command in accordance with the message brokering approach. The issuing includes forming a firmware update command that identifies a network location of the updated firmware file to be used by the data source devices, creating and attaching an integrity check value (e.g., hash value) for the updated firmware file, and attaching a date and time for when the data source device should begin executing operation with the updated firmware file.

The identifying of the network location of the updated firmware file may include attaching an IP address or web URL, or any other network location identifier. Further, the distributing of the update command to the trusted group of data source devices which are being managed, includes the replication and routing according to the enabled message brokering approach from the previous step.

The method continues at step 594, where each data source device of the trusted device group obtains, via a public network, updated firmware in accordance with the update command. The obtaining includes extracting and storing the network location identifier for the updated firmware file within the update command, extracting and storing the integrity check value, and extracting and storing the date and time for upgrade execution.

The obtaining subsequently includes requesting a download of a firmware update file over a public network at the network location identified in the update command, receiving the one or more messages containing the downloaded file, and storing the downloaded file. As one example, the network location identifier is a web URL address to an Internet-based download service containing the firmware update. As another example, the network location is a file transfer protocol (FTP) server where the file resides and can be downloaded. The storing of the downloaded firmware file may include flashing the file into nonvolatile memory.

The method continues at step 596, where each data source device of the trusted device group utilizes the updated firmware. The utilizing includes verifying the integrity of the updated firmware file using the previously extracted integrity check value, waiting for the date and time to arrive for the update execution (if one was extracted from the update command), and then executing the firmware update using the downloaded firmware file. The verifying the integrity includes comparing a hash of the downloaded firmware file with that of the hash value extracted from the update command. The executing of the firmware update includes performing a firmware upgrade restart in which the updated firmware is loaded in place of the previous firmware in the restart process in order to complete the authenticated firmware update.

The methods described above in conjunction with the processing module can alternatively be performed by other modules of the secure data network 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers) of the secure data network 10, cause the one or more computing devices to perform any or all of the method steps described above.

It is noted that terminologies as may be used herein such as stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprises:
    receiving, by a first computing entity of a secure data network, a request for first data from a data source device affiliated with the first computing entity by a user computing device of the secure data network, wherein the first data is encrypted using a first public key of a first key pair of the first computing entity to produce first encrypted data;
    determining, by the first computing entity, whether a re-encryption key of the user computing device is based on the first key pair of the first computing entity; and
    when the re-encryption key of the user computing device is not based on the first key pair of the first computing entity:
        decrypting, by the first computing entity, the first encrypted data using a private key of the first key pair to recover the first data;
        encrypting, by the first computing entity, the first data using a second public key of a second computing entity of the secure data network to produce second encrypted data, wherein the re-encryption key of the user computing device is based on a second key pair of the second computing entity;
        encrypting, by the first computing entity, the second encrypted data with the re-encryption key of the user computing device to produce double encrypted data; and
        sending, by the first computing entity, the double encrypted data to the user computing device, wherein the user computing device is capable of decrypting the double encrypted data using a private key of the user computing device to recover the first data, wherein the private key of the user computing device is paired with a public key of the user computing device, and wherein the re-encryption key of the user computing device is further based on the public key of the user computing device.

2. The method of claim 1 further comprises:
    when the re-encryption key of the user computing device is based on the first key pair of the first computing entity:
        encrypting, by the first computing entity, the first encrypted data with the re-encryption key of the user computing device to produce the double encrypted data; and
        sending, by the first computing entity, the double encrypted data to the user computing device.

3. The method of claim 1 further comprises:
    receiving, by the first computing entity, a second request for the first data by a second user computing device of the secure data network;
    determining, by the first computing entity, whether a second re-encryption key of the second user computing device is based on the first key pair of the first computing entity; and
    when the second re-encryption key of the second user computing device is not based on the first key pair of the first computing entity:
        decrypting, by the first computing entity, the first encrypted data using the private key of the first key pair to recover the first data;
        encrypting, by the first computing entity, the first data using a third public key of a third computing entity of the secure data network to produce third encrypted data, wherein the second re-encryption key of the second user computing device is based on a third key pair of the third computing entity;
        encrypting, by the first computing entity, the third encrypted data with the second re-encryption key of the second user computing device to produce second double encrypted data; and
        sending, by the first computing entity, the second double encrypted data to the second user computing device, wherein the second user computing device is capable of decrypting the second double encrypted data using a private key of the second user computing device to recover the first data, wherein the private key of the second user computing device is paired with a public key of the second user computing device, and wherein the second re-encryption key of the second user computing device is further based on the public key of the second user computing device.

4. The method of claim 3 further comprises:
    when the second re-encryption key of the second user computing device is based on the first key pair of the first computing entity:
        encrypting, by the first computing entity, the first encrypted data with the second re-encryption key of the second user computing device to produce the second double encrypted data; and
        sending, by the first computing entity, the second double encrypted data to the second user computing device.

5. The method of claim 1, wherein the determining whether the re-encryption key of the user computing device is based on the first key pair of the first computing entity comprises one of:
    indicating that the re-encryption key of the user computing device is not based on the first key pair of the first computing entity when detecting at least one of:

a public key of the request for first data compares unfavorably to the first public key of the first key pair of the first computing entity;
an identifier of the user computing device compares unfavorably to an entry of a list of identifiers of user computing devices affiliated with the first computing entity; and
an identifier of a key generating authority utilized to generate the re-encryption key of the user computing device compares unfavorably to an identifier of the first computing entity; and
indicating that the re-encryption key of the user computing device is based on the first key pair of the first computing entity when detecting at least one of:
the public key of the request for first data compares favorably to the first public key of the first key pair of the first computing entity;
the identifier of the user computing device compares favorably to the entry of the list of identifiers of user computing devices affiliated with the first computing entity; and
the identifier of the key generating authority utilized to generate the re-encryption key of the user computing device compares favorably to the identifier of the first computing entity.

6. The method of claim 1 further comprises:
determining, by the first computing entity, that the re-encryption key of the user computing device is based on the second key pair of the second computing entity when detecting at least one of:
a public key of the request for first data compares favorably to the second public key of the second key pair of the second computing entity;
an identifier of the user computing device compares favorably to an entry of a list of identifiers of user computing devices affiliated with the second computing entity; and
an identifier of a key generating authority utilized to generate the re-encryption key of the user computing device compares favorably to an identifier of the second computing entity.

7. A computing device comprises:
an interface;
a local memory; and
a processing module operably coupled to the interface and the local memory, wherein the processing module functions to:
receive, via the interface, a request for first data from a data source device affiliated with a first computing entity of a secure data network by a user computing device of the secure data network, wherein the first data is encrypted using a first public key of a first key pair of the first computing entity to produce first encrypted data;
determine whether a re-encryption key of the user computing device is based on the first key pair of the first computing entity; and
when the re-encryption key of the user computing device is not based on the first key pair of the first computing entity:
decrypt the first encrypted data using a private key of the first key pair to recover the first data;
encrypt the first data using a second public key of a second computing entity of the secure data network to produce second encrypted data, wherein the re-encryption key of the user computing device is based on a second key pair of the second computing entity;
encrypt the second encrypted data with the re-encryption key of the user computing device to produce double encrypted data; and
send, via the interface, the double encrypted data to the user computing device, wherein the user computing device is capable of decrypting the double encrypted data using a private key of the user computing device to recover the first data, wherein the private key of the user computing device is paired with a public key of the user computing device, and wherein the re-encryption key of the user computing device is further based on the public key of the user computing device.

8. The computing device of claim 7, wherein the processing module further functions to:
when the re-encryption key of the user computing device is based on the first key pair of the first computing entity:
encrypt the first encrypted data with the re-encryption key of the user computing device to produce the double encrypted data; and
send, via the interface, the double encrypted data to the user computing device.

9. The computing device of claim 7, wherein the processing module further functions to:
receive, via the interface, a second request for the first data by a second user computing device of the secure data network;
determine whether a second re-encryption key of the second user computing device is based on the first key pair of the first computing entity; and
when the second re-encryption key of the second user computing device is not based on the first key pair of the first computing entity:
decrypt the first encrypted data using the private key of the first key pair to recover the first data;
encrypt the first data using a third public key of a third computing entity of the secure data network to produce third encrypted data, wherein the second re-encryption key of the second user computing device is based on a third key pair of the third computing entity;
encrypt the third encrypted data with the second re-encryption key of the second user computing device to produce second double encrypted data; and
send, via the interface, the second double encrypted data to the second user computing device, wherein the second user computing device is capable of decrypting the second double encrypted data using a private key of the second user computing device to recover the first data, wherein the private key of the second user computing device is paired with a public key of the second user computing device, and wherein the second re-encryption key of the second user computing device is further based on the public key of the second user computing device.

10. The computing device of claim 9, wherein the processing module further functions to:
when the second re-encryption key of the second user computing device is based on the first key pair of the first computing entity:
encrypt the first encrypted data with the second re-encryption key of the second user computing device to produce the second double encrypted data; and send, via the interface, the second double encrypted data to the second user computing device.

11. The computing device of claim 7, wherein the processing module functions to determine whether the re-encryption key of the user computing device is based on the first key pair of the first computing entity by one of:
  indicating that the re-encryption key of the user computing device is not based on the first key pair of the first computing entity when detecting at least one of:
    a public key of the request for first data compares unfavorably to the first public key of the first key pair of the first computing entity;
    an identifier of the user computing device compares unfavorably to an entry of a list of identifiers of user computing devices affiliated with the first computing entity; and
    an identifier of a key generating authority utilized to generate the re-encryption key of the user computing device compares unfavorably to an identifier of the first computing entity; and
  indicating that the re-encryption key of the user computing device is based on the first key pair of the first computing entity when detecting at least one of:
    the public key of the request for first data compares favorably to the first public key of the first key pair of the first computing entity;
    the identifier of the user computing device compares favorably to the entry of the list of identifiers of user computing devices affiliated with the first computing entity; and
    the identifier of the key generating authority utilized to generate the re-encryption key of the user computing device compares favorably to the identifier of the first computing entity.

12. The computing device of claim 7, wherein the processing module further functions to:
  determine that the re-encryption key of the user computing device is based on the second key pair of the second computing entity when detecting at least one of:
    a public key of the request for first data compares favorably to the second public key of the second key pair of the second computing entity;
    an identifier of the user computing device compares favorably to an entry of a list of identifiers of user computing devices affiliated with the second computing entity; and
    an identifier of a key generating authority utilized to generate the re-encryption key of the user computing device compares favorably to an identifier of the second computing entity.

13. A computer readable memory comprises:
  a first memory element that stores operational instructions that, when executed by a processing module of a first computing entity of a secure data network, causes the processing module to:
    receive a request for first data from a data source device affiliated with the first computing entity by a user computing device of the secure data network, wherein the first data is encrypted using a first public key of a first key pair of the first computing entity to produce first encrypted data;
  a second memory element that stores operational instructions that, when executed by the processing module, causes the processing module to:
    determine whether a re-encryption key of the user computing device is based on the first key pair of the first computing entity; and
  a third memory element that stores operational instructions that, when executed by the processing module, causes the processing module to:
    when the re-encryption key of the user computing device is not based on the first key pair of the first computing entity:
      decrypt the first encrypted data using a private key of the first key pair to recover the first data;
      encrypt the first data using a second public key of a second computing entity of the secure data network to produce second encrypted data, wherein the re-encryption key of the user computing device is based on a second key pair of the second computing entity;
      encrypt the second encrypted data with the re-encryption key of the user computing device to produce double encrypted data; and
      send the double encrypted data to the user computing device, wherein the user computing device is capable of decrypting the double encrypted data using a private key of the user computing device to recover the first data, wherein the private key of the user computing device is paired with a public key of the user computing device, and wherein the re-encryption key of the user computing device is further based on the public key of the user computing device.

14. The computer readable memory of claim 13 further comprises:
  the third memory element further stores operational instructions that, when executed by the processing module, causes the processing module to:
    when the re-encryption key of the user computing device is based on the first key pair of the first computing entity:
      encrypt the first encrypted data with the re-encryption key of the user computing device to produce the double encrypted data; and
      send the double encrypted data to the user computing device.

15. The computer readable memory of claim 13 further comprises:
  the first memory element further stores operational instructions that, when executed by the processing module, causes the processing module to:
    receive a second request for the first data by a second user computing device of the secure data network;
  the second memory element further stores operational instructions that, when executed by the processing module, causes the processing module to:
    determine whether a second re-encryption key of the second user computing device is based on the first key pair of the first computing entity; and
  the third memory element further stores operational instructions that, when executed by the processing module, causes the processing module to:
    when the second re-encryption key of the second user computing device is not based on the first key pair of the first computing entity:
      decrypt the first encrypted data using the private key of the first key pair to recover the first data;
      encrypt the first data using a third public key of a third computing entity of the secure data network to produce third encrypted data, wherein the second re-encryption key of the second user computing device is based on a third key pair of the third computing entity;

encrypt the third encrypted data with the second re-encryption key of the second user computing device to produce second double encrypted data; and send the second double encrypted data to the second user computing device, wherein the second user computing device is capable of decrypting the second double encrypted data using a private key of the second user computing device to recover the first data, wherein the private key of the second user computing device is paired with a public key of the second user computing device, and wherein the second re-encryption key of the second user computing device is further based on the public key of the second user computing device.

16. The computer readable memory of claim 15 further comprises:

the third memory element further stores operational instructions that, when executed by the processing module, causes the processing module to:

when the second re-encryption key of the second user computing device is based on the first key pair of the first computing entity:

encrypt the first encrypted data with the second re-encryption key of the second user computing device to produce the second double encrypted data; and send the second double encrypted data to the second user computing device.

17. The computer readable memory of claim 13 further comprises:

the second memory element further stores operational instructions that, when executed by the processing module, causes the processing module to determine whether the re-encryption key of the user computing device is based on the first key pair of the first computing entity by one of:

indicating that the re-encryption key of the user computing device is not based on the first key pair of the first computing entity when detecting at least one of:

a public key of the request for first data compares unfavorably to the first public key of the first key pair of the first computing entity;

an identifier of the user computing device compares unfavorably to an entry of a list of identifiers of user computing devices affiliated with the first computing entity; and an identifier of a key generating authority utilized to generate the re-encryption key of the user computing device compares unfavorably to an identifier of the first computing entity; and indicating that the re-encryption key of the user computing device is based on the first key pair of the first computing entity when detecting at least one of:

the public key of the request for first data compares favorably to the first public key of the first key pair of the first computing entity;

the identifier of the user computing device compares favorably to the entry of the list of identifiers of user computing devices affiliated with the first computing entity; and the identifier of the key generating authority utilized to generate the re-encryption key of the user computing device compares favorably to the identifier of the first computing entity.

18. The computer readable memory of claim 13 further comprises:

the third memory element further stores operational instructions that, when executed by the processing module, causes the processing module to:

determine that the re-encryption key of the user computing device is based on the second key pair of the second computing entity when detecting at least one of:

a public key of the request for first data compares favorably to the second public key of the second key pair of the second computing entity;

an identifier of the user computing device compares favorably to an entry of a list of identifiers of user computing devices affiliated with the second computing entity; and an identifier of a key generating authority utilized to generate the re-encryption key of the user computing device compares favorably to an identifier of the second computing entity.

* * * * *